United States Patent
Badic et al.

(10) Patent No.: US 11,791,958 B2
(45) Date of Patent: Oct. 17, 2023

(54) METHODS AND DEVICES FOR RADIO RESOURCE ALLOCATION

(71) Applicant: Apple Inc., Cupertino, CA (US)

(72) Inventors: Biljana Badic, Munich (DE); Markus Dominik Mueck, Unterhaching (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/937,943

(22) Filed: Mar. 28, 2018

(65) Prior Publication Data

US 2019/0305903 A1 Oct. 3, 2019

(51) Int. Cl.
| | | |
|---|---|---|
| *H04L 5/00* | (2006.01) | |
| *H04W 24/08* | (2009.01) | |
| *H04W 64/00* | (2009.01) | |
| *H04W 72/04* | (2023.01) | |
| *H04W 72/542* | (2023.01) | |

(52) U.S. Cl.
CPC .......... *H04L 5/0041* (2013.01); *H04L 5/0053* (2013.01); *H04W 24/08* (2013.01); *H04W 64/003* (2013.01); *H04W 72/542* (2023.01); *H04L 5/0007* (2013.01)

(58) Field of Classification Search
CPC ... H04L 5/0041; H04L 5/0053; H04L 5/0007; H04W 24/08; H04W 64/003; H04W 72/085
See application file for complete search history.

(56) References Cited

U.S. PATENT DOCUMENTS

| | | | | |
|---|---|---|---|---|
| 9,843,898 | B1* | 12/2017 | Greenberger | H04W 4/023 |
| 2012/0287848 | A1 | 11/2012 | Kim et al. | |
| 2013/0157687 | A1* | 6/2013 | Mori | H04W 48/20 |
| | | | | 455/456.1 |
| 2014/0241260 | A1* | 8/2014 | Schmidt | H04W 72/04 |
| | | | | 370/329 |
| 2015/0103778 | A1* | 4/2015 | Kim | H04B 7/026 |
| | | | | 370/329 |
| 2015/0289282 | A1* | 10/2015 | Phuyal | H04W 76/14 |
| | | | | 370/329 |

(Continued)

FOREIGN PATENT DOCUMENTS

| | | |
|---|---|---|
| CN | 105101442 | 11/2015 |
| CN | 105792364 | 7/2016 |

(Continued)

OTHER PUBLICATIONS

Guangdong Oppo Mobile Telecom, "Discussion on the mode-2 resource allocation for V2V", dated May 13, 2016, 6 pages, 3GPP TSGRAN WG1 Meeting #85, Nanjing, China.

(Continued)

*Primary Examiner* — Scott M Sciacca
(74) *Attorney, Agent, or Firm* — Kowert, Hood, Munyon, Rankin & Goetzel, P.C.

(57) ABSTRACT

A method of allocating radio resources includes identifying a first grouping of terminal devices and a second grouping of terminal devices based on reporting information that indicates terminal device positions, selecting first radio resources and second radio resources based on a distance between the first grouping and the second grouping, and assigning the first radio resources to the first grouping and assigning the second radio resources to the second grouping.

20 Claims, 15 Drawing Sheets

(56) References Cited

U.S. PATENT DOCUMENTS

| | | | |
|---|---|---|---|
| 2016/0029236 A1 | 1/2016 | Sudo | |
| 2016/0044486 A1* | 2/2016 | Pais | H04W 8/005 |
| | | | 370/252 |
| 2016/0295624 A1* | 10/2016 | Novlan | H04W 72/04 |
| 2016/0338122 A1* | 11/2016 | Tsai | H04W 8/005 |
| 2017/0086216 A1* | 3/2017 | Patil | H04W 72/044 |
| 2018/0098193 A1* | 4/2018 | Davenport | H04W 4/06 |
| 2018/0103503 A1* | 4/2018 | Bennis | H04L 67/10 |
| 2018/0115970 A1* | 4/2018 | Chae | G08G 1/012 |
| 2018/0176785 A1* | 6/2018 | Chuang | H04W 16/10 |
| 2018/0279096 A1* | 9/2018 | Wu | H04W 72/121 |
| 2019/0140796 A1* | 5/2019 | Wang | H04W 72/21 |

FOREIGN PATENT DOCUMENTS

| | | |
|---|---|---|
| CN | 106605440 | 4/2017 |
| CN | 107078834 | 8/2017 |
| KR | 20170138458 A | 12/2017 |
| WO | WO2014171596 | 10/2014 |
| WO | WO2016072205 | 5/2016 |

OTHER PUBLICATIONS

Kitasuka et al., "Positioning Technique of Wireless LAN Terminals Using RSSI between Terminals", retrieved from the internet: (URL:https://www.researchgate.netpublication/221228342_Positioning_Technique_of_Wireless_LAN_Terminals_Using_RSSI_between_Terminals), retrieved on Jun. 19, 2019, 7 pages.

International Search Report issued for corresponding application No. PCT/US2019/019472, dated Jun. 14, 2019, 14 pages (for informational purpose only).

Notice of Grant for CN Application No. 2019800138510; dated Jun. 30, 2023.

* cited by examiner

METHODS AND DEVICES FOR RADIO RESOURCE ALLOCATION

TECHNICAL FIELD

Various embodiments relate generally to methods and devices for radio resource allocation

BACKGROUND

The near-far problem can lead to interference in various radio communication scenarios. This effect can be caused when a device attempts to receive an information signal from a distant transmitter when an interfering transmitter transmits a simultaneous interfering signal proximate to the device. As the interfering transmitter is close to the device and the distant transmitter is distant, the device may receive the interfering signal with higher received signal strength than the information signal. This can be problematic when the device attempts to receive and decode the information signal, as the interfering signal may corrupt the information signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
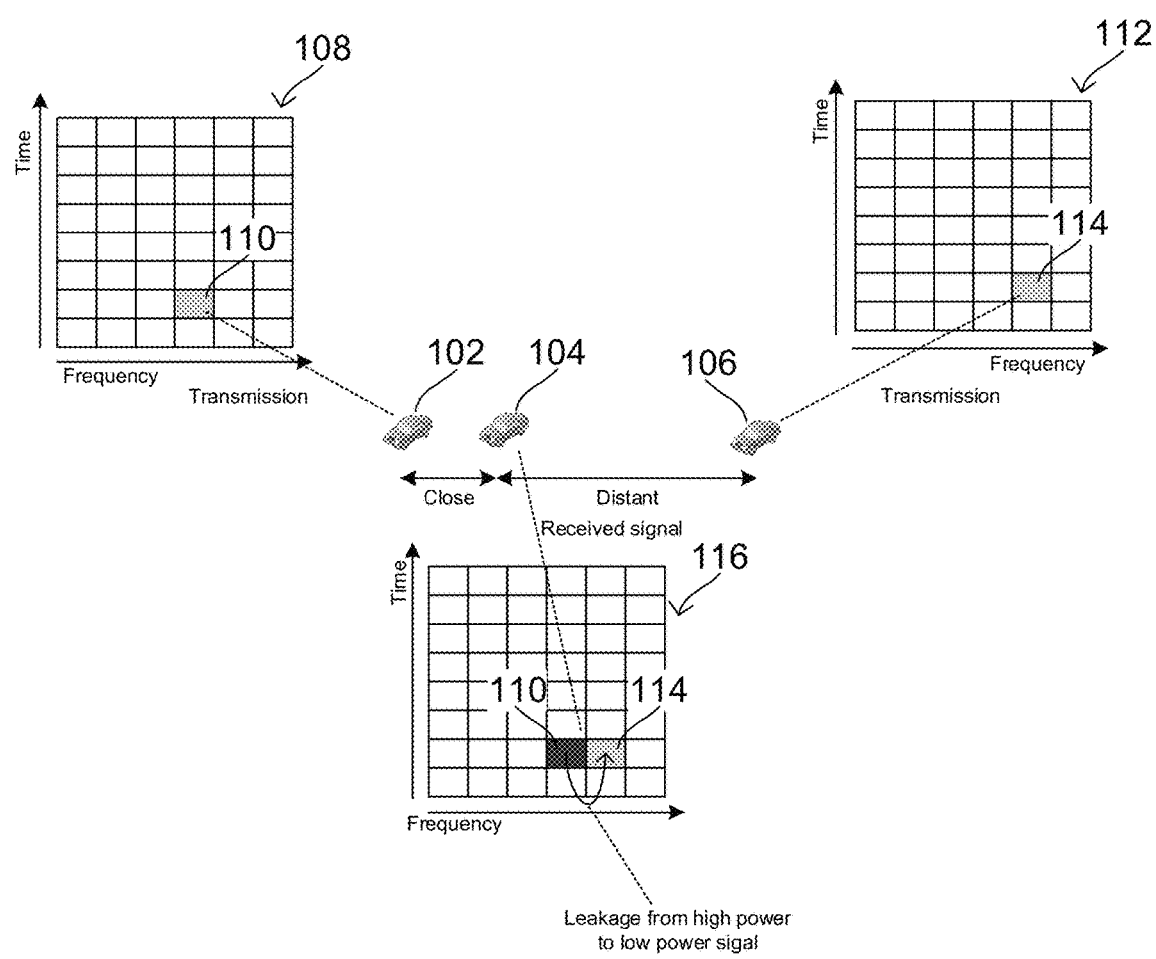
FIG. 1 shows an exemplary depiction of the near-far problem according to some aspects.

The following detailed description refers to the accompanying drawings that show, by way of illustration, specific details and aspects of embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", among others, and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, among others, of data, observations, information, signals, samples, symbols, elements, among others.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Furthermore, registers, shift registers, processor registers, data buffers, among others, are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components, that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, among others Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, among others), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, among others), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), among others. Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (e.g., allocated for example in US (FCC Part 15)), 863-868.6 MHz (e.g., allocated for example in European Union (ETSI EN 300 220)), 915.9-929.7 MHz (e.g., allocated for example in Japan), 917-923.5 MHz (e.g., allocated for example in South Korea), 755-779 MHz and 779-787 MHz (e.g., allocated for example in China), 790-960 MHz, 1710-2025 MHz, 2110-2200 MHz, 2300-2400 MHz, 2.4-2.4835 GHz (e.g., it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (e.g., allocated for example in the US for Citizen Broadband Radio Service), 5.15-5.25 GHz and 5.25-5.35 GHz and 5.47-5.725 GHz and 5.725-5.85 GHz bands (e.g., allocated for example in the US (FCC part 15), consists four U-NII bands in total 500 MHz spectrum), 5.725-5.875 GHz (e.g., allocated for example in EU (ETSI EN 301 893)), 5.47-5.65 GHz (e.g., allocated for example in South Korea, 5925-7125 MHz and 5925-6425 MHz band (e.g., under consideration in US and EU, respectively, where next generation Wi-Fi system may also include the 6 GHz spectrum as operating band), IMT-advanced spectrum, IMT-2020 spectrum (expected to include 3600-3800 MHz, 3.5 GHz bands, 700 MHz bands, bands within the 24.25-86 GHz range, among others), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, among others), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., where this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, among others applications.

Aspects described herein can also implement a hierarchical application of the scheme is possible, e.g. by introducing a hierarchical prioritization of usage for different types of users (e.g., low/medium/high priority, among others), based on a prioritized access to the spectrum e.g. with highest priority to tier-1 users, followed by tier-2, then tier-3, and so forth users. Aspects described herein can also be applied to different Single Carrier or OFDM flavors (CP-OFDM, SC-FDMA, SC-OFDM, filter bank-based multicarrier (FBMC), OFDMA, among others) and in particular 3GPP NR (New Radio) by allocating the OFDM carrier data bit vectors to the corresponding symbol resources.]. Some of the features in this disclosure are defined for the network side, such as Access Points, eNodeBs, among others In some cases, a User Equipment (UE) may also take this role and act as an Access Points, eNodeBs, or the like. some or all features defined for network equipment may be implemented by a UE.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

In vehicle-to-vehicle (V2V) networks, vehicles may transmit to each other from different positions as they move dynamically. The received signal power seen at each of the vehicles can therefore vary based on the changing distances between vehicles. In an exemplary scenario, a first vehicle may be positioned closer to a second vehicle than a third vehicle. When the second and third vehicles transmit simultaneously, the transmission from the closer second vehicle may have higher received signal power at the first vehicle than the transmission from the distant third vehicle. The transmission from the closer second vehicle can therefore interfere with the transmission from the distant third vehicle due to its stronger received signal power seen at the first vehicle.

This interference can occur even when the second and third vehicles transmit on different spectrum, as neighboring channels can leak onto each other and corrupt desired signals. For example, if the first vehicle is trying to receive a desired signal from the distant third vehicle and the closer second vehicle transmits at the same time on a neighboring channel, the transmission from the closer second vehicle may leak onto the desired signal transmitted by the distant third vehicle. As the second vehicle is closer to the first vehicle than the third vehicle, the transmission by the second vehicle may have higher power and interfere with the weaker desired signal. The desired signal may be too weak for the first vehicle to receive it in the presence of the interfering transmission by the second vehicle. This can result in the loss of information in the desired signal. While undesirable in many scenarios, this information loss can be particularly adverse in autonomous driving use cases where the loss of information can result in life-threatening scenarios.

This problem with varying received signal power is termed the near-far problem. As further described herein, various aspects of this disclosure may utilize a specific resource allocation routine that can mitigate the impact of the near-far problem. In some aspects, this resource allocation routine can allocate radio resources to terminal devices based on their distances from each other. For example, the resource allocation routine can allocate radio resources for terminal devices where the radio resources are separated by a distance (e.g., in frequency and/or time) that depends on the on the proximity of the terminal devices. As further described below, this can yield an allocation that provides proximate radio resources (e.g., in frequency and/or time) to terminal devices that are close to each other and distant radio resources to terminal devices that are distant from each other. While some examples may be presented herein for vehicular use cases, these techniques can likewise be implemented in any radio communication use case.

FIG. 1 shows an example of the near-far problem according to some aspects. As shown in FIG. 1, vehicle 102 may be located proximate to vehicle 104 and vehicle 106 may be located distant from vehicle 104. In an exemplary scenario, vehicle 104 may attempt to receive an information signal from vehicle 106. Resource grids 108 and 112 show the transmission activity of vehicles 102 and 106, respectively, while resource grid 116 shows the reception activity of vehicle 104. As shown in resource grid 112, vehicle 106 may transmit the information signal on radio resource 114 (e.g., a time-frequency radio resource on a specific subcarrier and symbol slot, such as a resource element (RE). Vehicle 102 may perform a simultaneous transmission on radio resource 110, as shown in resource grid 108, which may be adjacent to radio resource 114. This simultaneous transmission by vehicle 102 may be the interfering signal.

As shown in resource gird 116, vehicle 104 may receive the information signal from vehicle 106 on radio resource 114 and receive the interfering signal from vehicle 102 on radio resource 110. As vehicle 102 is closer to vehicle 104 than vehicle 106, the interfering signal may have higher power than the information signal (as denoted by the darker shading of radio resource 110 in resource grid 116; e.g., assuming approximately equal transmit power by vehicles 102 and 106). Even though the information signal and the interfering signal are on different radio resources, the interfering signal in radio resource 110 may leak into radio resource 114 and consequently interfere with the information signal. Vehicle 104 may therefore have difficulty in receiving and decoding the information signal, and in some cases may not be able to successfully recover the information included therein.

Figure 2:
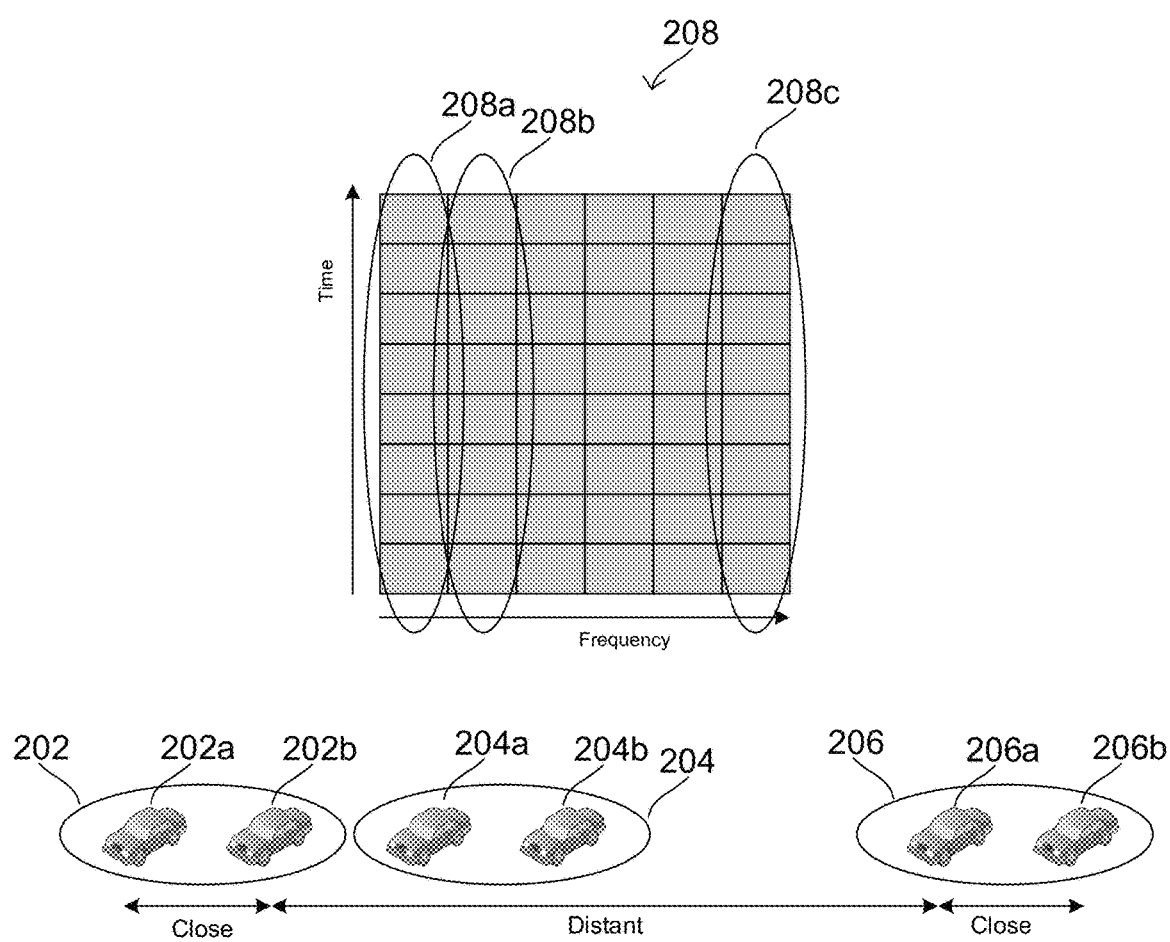
FIG. 2 shows an exemplary demonstration of a resource allocation according to some aspects.

Accordingly, various aspects of this disclosure relate to a resource allocation routine for allocating radio resources to terminal devices (e.g., vehicular, portable, or any other type of terminal device) to help mitigate impacts of the near-far problem. FIG. 2 shows an introductory example of this resource allocation routine. As shown in FIG. 2, vehicles 202a and 202b may be located proximate to each other (e.g., within a distance threshold, such as a geographic distance threshold or within a signal strength threshold). Similarly, vehicles 204a and 204b may be located proximate to each other while vehicles 206a and 206b may also be located proximate to each other.

The resource allocation routine may operate to allocate radio resources for vehicles 202a-206b to use for transmitting and receiving to each other. In some aspects, the resource allocation routine may be executed by a network-side component, such as at a network access node or a core network server. In some aspects, the resource allocation routine may be executed by a user-side component, such as at one of vehicles 202a-206b. The implementation of these aspects is described below in full. In various aspects, the resource allocation routine may attempt to allocate radio resources to vehicles 202a-206b to mitigate harmful impacts of the near-far problem. For example, the resource allocation routine may attempt to allocate proximate radio resources to vehicles that are close together and to allocate distant radio resources to vehicles that are far apart. In one example, the separation (e.g., separation in frequency and/or time) between the radio resources allocated to two vehicles may depend on the geographic distance between the two vehicles.

In one example using FIG. 2, the resource allocation routine may allocate radio resources 208a to vehicles 202a and 202b (e.g., to use for transmitting and/or receiving), radio resources 208b to vehicles 204a and 204b, and radio resources 208c to vehicles 206a and 206b. As shown in the example of resource grid 208, radio resources 208a and 208b may be adjacent in frequency (or, in other examples, may be proximate to each other) while radio resources 208c may be distant in frequency from radio resources 208a and 208b (e.g., on opposite ends of a predefined pool of radio resources) For instance, radio resources 208a may be lower frequencies (e.g., one or more subcarriers at the lower end of a resource block), radio resources 208b may be adjacent higher frequencies (e.g., one or more subcarriers) to radio resources 208a, and radio resources 208c may be higher frequencies (e.g., one or more subcarriers at the higher end of a resource block). The separation in radio resources between different vehicles may therefore depend on the geographic distance between the vehicles. For example, as shown by the linear positioning of vehicles 202a-206b in FIG. 2, vehicles 202a and 202b may be located proximate to each other and may also be located proximate to vehicles 204a and 204b. Vehicles 202a, 202b, 204a, and 204b may therefore be allocated proximate radio resources. However, vehicles 206a and 206b may be located distant from vehicles 202a-204b, and may therefore be allocated distant radio resources from vehicles 202a-204b.

Figure 3:
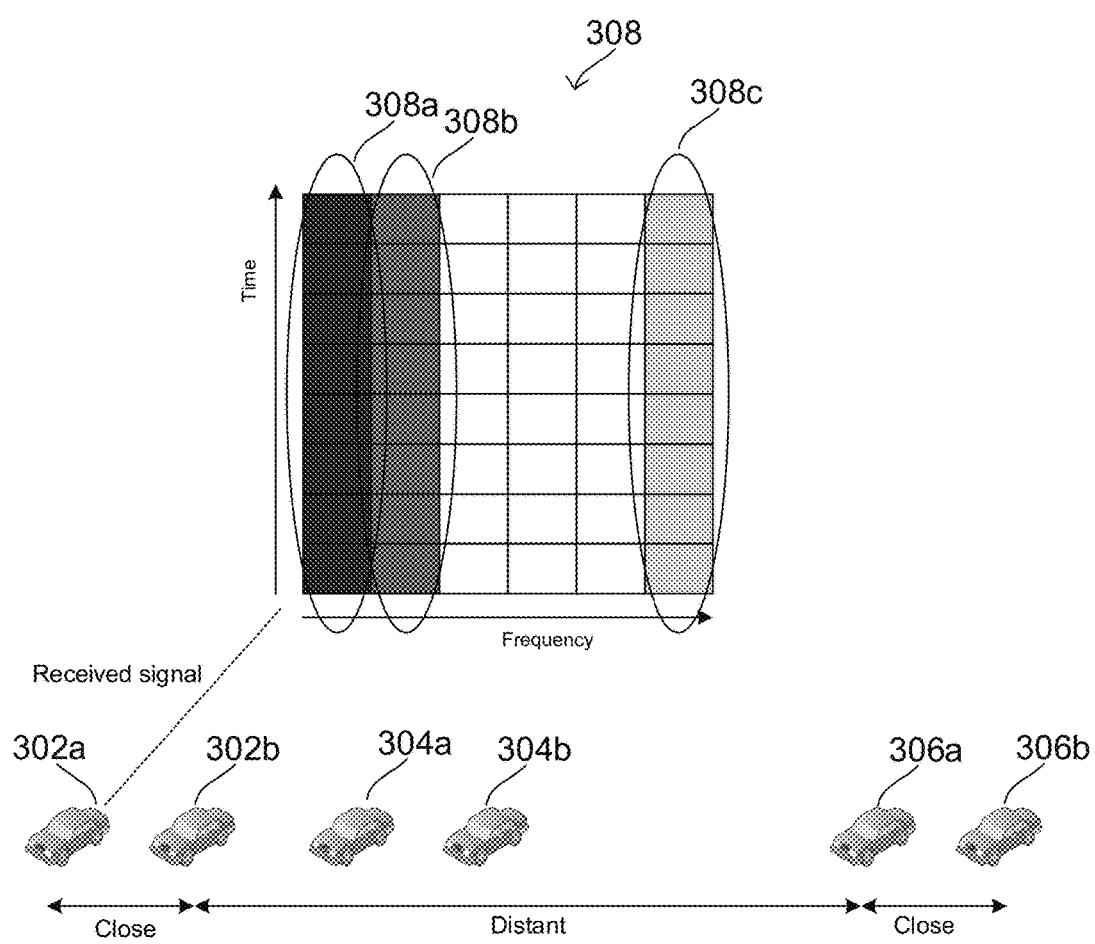
FIG. 3 shows an exemplary resource grid illustrating a received signal at a vehicle according to some aspects.

This allocation of radio resources based on the distance between vehicles may help to mitigate the near-far problem. FIG. 3 shows an example of the signal received by vehicle 302a according to some aspects. The shading of the radio resources in resource grid 308 indicates the received signal power seen by vehicle 302a, where darker shades indicate stronger received signal power and lighter shades indicate weaker received signal power. In particular, radio resources 308a may have the strongest received signal power (out of radio resources 308a, 308b, and 308c) because they are allocated to vehicle 302b, which is closest to vehicle 302a (out of vehicles 302b-306b). Radio resources 308b may have the second strongest received signal power as they are allocated to vehicles 304a and 304b, which are located between vehicle 302a and vehicles 306a and 306b. Radio resources 308c may have the weakest received signal power as they are allocated to vehicles 306a and 306b, which are located furthest from vehicle 302a (out of vehicles 302b-306b). This example assumes that the transmit power is approximately equal, and therefore that closer transmissions will have stronger received signal power at vehicle 302a than more distant transmissions.

In an exemplary demonstration of near-far problem mitigation, vehicle 302a may attempt to receive an information signal from vehicle 306a. Vehicle 306a may therefore transmit the information signal on radio resources 308c (the radio resources allocated to vehicle 306a), which vehicle 302a may use to receive the information signal. Even if another vehicle proximate to vehicle 302a, such as vehicle 304a, transmits at the same time as vehicle 306b, interference may be avoided due to the separation in radio resources. In particular, vehicle 304 will transmit this interfering signal on radio resources 308b, which are separated from radio resources 308c on which vehicle 306b transmitted the information signal on. This separation (e.g., separation in frequency in the example of FIG. 3) in radio resources may avoid leakage, even in cases where the interfering signal has stronger received signal power than the information signal.

Figure 4:
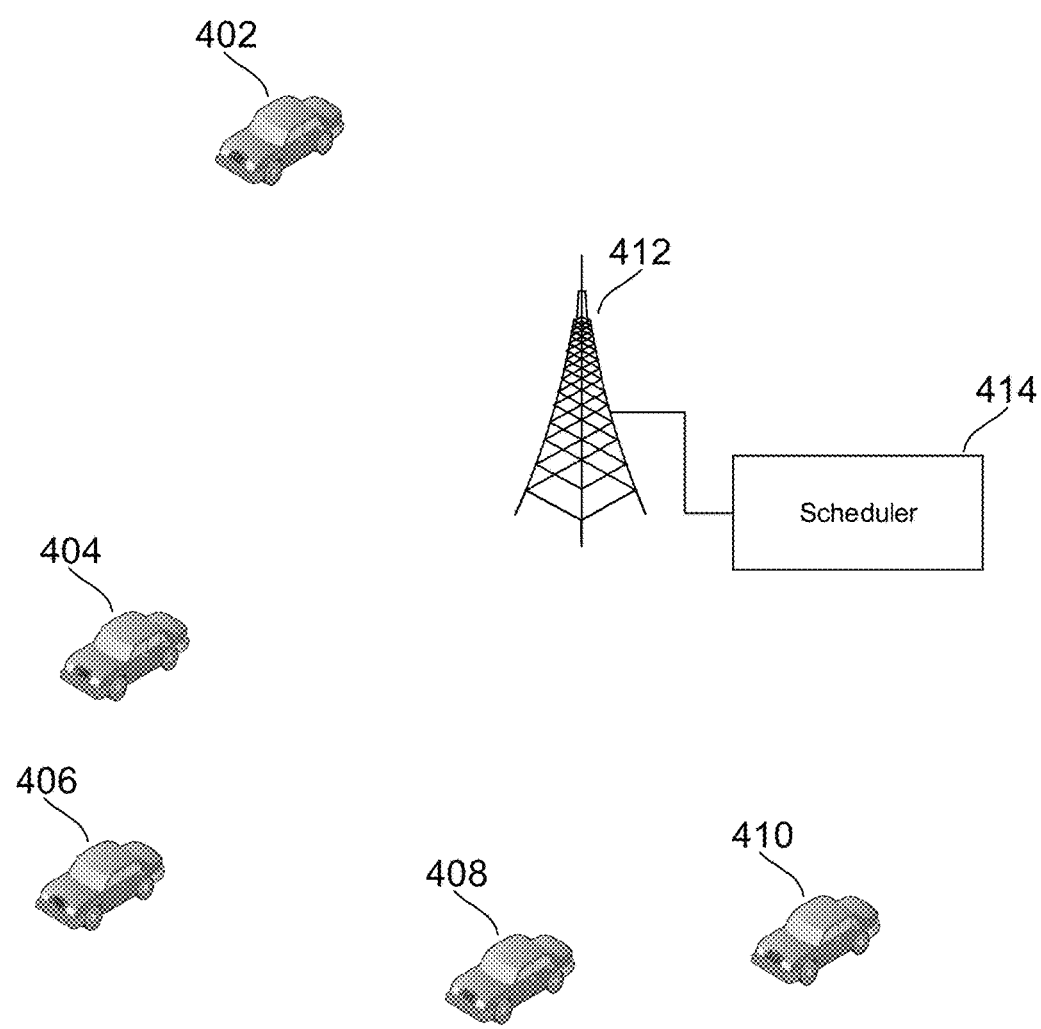
FIG. 4 shows an exemplary network illustration including a scheduler deployed with a network-side deployment according to some aspects.

As previously introduced, various aspects may implement a resource allocation routine that is configured to allocate radio resources. This resource allocation routine may be executed by a scheduler responsible for allocating radio resources in a radio communication network, where the scheduler can be located on the user-side (e.g., in a terminal device) or on the network-side (e.g., in a network access node or in a core network server). FIG. 4 shows an example according to some aspects where scheduler 414 may be deployed on the network-side. As shown in FIG. 4, scheduler 414 may interface with network access node 412, which may provide a radio access network for terminal devices 402-410 (which may be vehicles, mobile phones, or any other type of terminal device). In some aspects, scheduler 414 may be an internal component of network access node 412, such as part of a baseband unit (BBU) of network access node 412. In some aspects, scheduler 414 may be an external component to network access node 412, such as a core network server located in a core network to which network access node 412 is connected.

Scheduler 414 may be configured to execute the resource allocation routine to allocate radio resources to terminal devices, such as to terminal devices 402-410. Accordingly, scheduler 414 may be configured to select radio resources for allocation to each of terminal devices 402-410 and to allocate the selected radio resources to terminal devices 402-410, such as by transmitting control signaling to terminal devices 402-410 that specifies their allocated radio resources. Scheduler 414 may use network access node 412 to transmit this control signaling to terminal devices 402-410. For example, after generating the control signaling, scheduler 414 may transmit the control signaling to terminal devices 402-410 via network access node 412. Scheduler 414 may therefore transmit the control signaling by sending the control signaling to network access node 412, which may then wirelessly transmit the control signaling to terminal devices 402-410 via the radio access network.

As previously introduced, scheduler 414 may be configured to allocate radio resources to terminal devices 402-410 where the separation in radio resources allocated to different vehicles depends on their geographical distance from each other. For example, scheduler 414 may be configured to allocate proximate radio resources (e.g., in terms of separation in time and/or frequency) to terminal devices that are close to each other and to allocate distant radio resources to terminal devices that are distant from each other. Expressed another way, scheduler 414 may be configured to allocate radio resource to terminal devices where the separation between radio resources allocated to terminal devices that are close together is less than the separation between radio resources allocated to terminal devices that are further apart.

Figure 5:
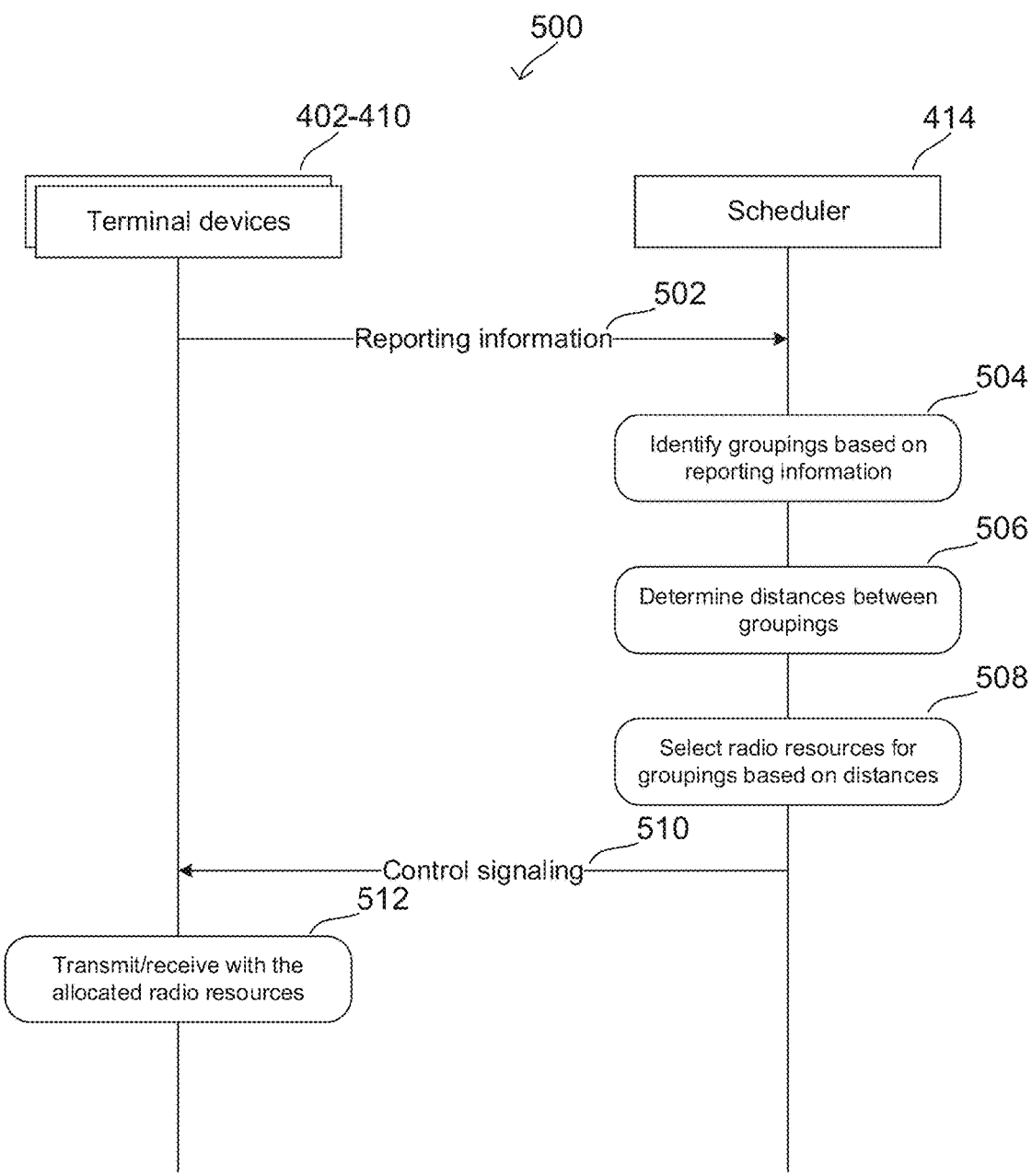
FIG. 5 shows an exemplary message sequence chart describing a resource allocation routine using groupings according to some aspects.

In some aspects, scheduler 514 may be configured to use groupings to allocate radio resources. FIG. 5 shows exemplary message sequence chart 500 according to some aspects, which illustrates a grouping-based resource allocation routine executed by scheduler 414. In some aspects, scheduler 414 may be one or more processors configured to retrieve and execute program code that defines the resource allocation routine as executable instructions. The algorithmic functionality shown in FIG. 5 and described herein may therefore be embodied as executable instructions for scheduler 414 to execute on its one or more processors.

As shown in FIG. 5, terminal devices 402-410 may first provide reporting information to scheduler 414 in stage 502. Scheduler 414 may use this reporting information to identify groupings of terminal devices and to allocate radio resources to the groupings. In some aspects, the reporting information may include position reports from terminal devices 402-410. In an example using terminal device 402, terminal device 402 may determine its position, such as by using a geopositional sensor. Terminal device 402 may then transmit this position as reporting information to scheduler 414 (e.g., by transmitting the reporting information to scheduler 414 via network access node 412). Scheduler 414 may therefore receive the position of terminal device 402 as part of the reporting information. In some aspects, scheduler 414 may additionally or alternatively determine the position of terminal device 402 using other methods, such as by using triangulation by network access nodes. Scheduler 414 may include this as a position report in the reporting information In some aspects, the reporting information may additionally or alternatively include radio measurements performed by terminal devices 402-410. In one example using terminal device 402, terminal device 402 may perform a radio measurement such as a signal strength measurement on a signal received from terminal device 404. Terminal device 402 may then transmit the radio measurement to scheduler 414 as reporting information.

Figure 6:
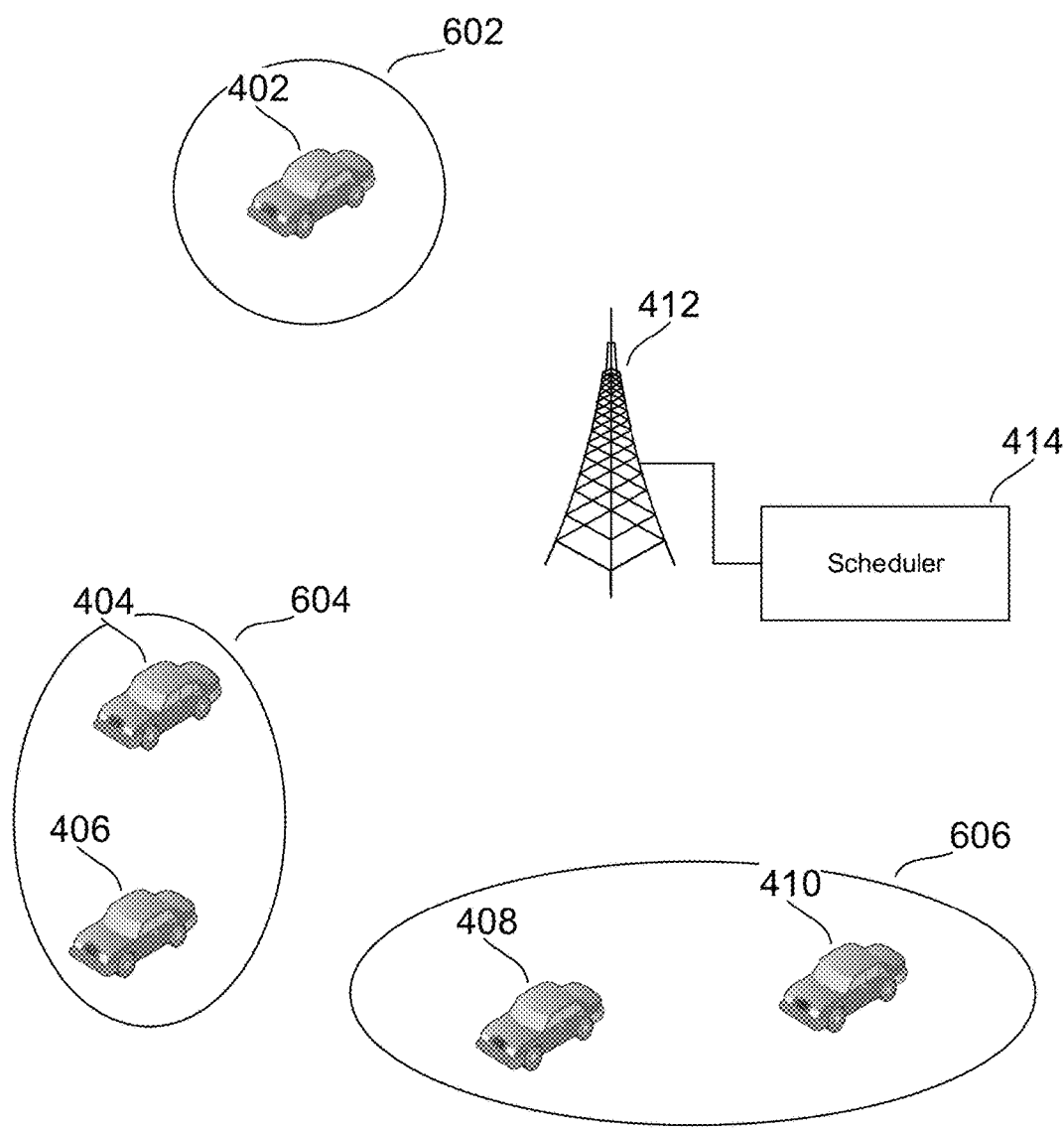
FIG. 6 shows an exemplary network illustration where a scheduler uses groupings to perform a resource allocation routine according to some aspects.

Scheduler 414 may therefore receive the reporting information from terminal devices 402-410. Scheduler 414 may then identify groupings of terminal devices 402-410 based on the reporting information in stage 504. For example, scheduler 414 may identify terminal devices that are proximate to each other, e.g., within a predefined distance from each other, and assign these proximate terminal devices to a grouping. FIG. 6 shows an exemplary result of this grouping for terminal devices 402-410. As shown in FIG. 6, scheduler 414 may assign terminal device 402 into its own grouping 602 (e.g., as terminal device 402 may not be proximate to any other terminal devices), assign terminal devices 404 and 406 into grouping 604 (e.g., as terminal devices 404 and 406 are proximate), and assign terminal devices 408 and 410 into grouping 606 (e.g., as terminal devices 404 and 406 are proximate to each other).

As previously indicated, the reporting information may include position reports and/or radio measurements for terminal devices 402-410. In some aspects where the reporting information includes position reports for terminal devices 402-410, scheduler 414 may identify the groupings in stage 504 by determining, based on the position reports, which terminal devices and/or groups of terminal devices are within a predefined distance of each other. In the example of FIG. 6, scheduler 414 may identify the positions of each of terminal devices 402-410 with their position reports in the reporting information. Scheduler 414 may then compare the positions with each other to determine the distances between each of terminal devices 402-410 (e.g., by calculating the distance as a difference between the positions). Scheduler 414 may then determine whether any of the distances are less than a predefined distance (e.g., a predefined value set by a designer) and, if so, may assign the corresponding terminal devices to a grouping.

In the example of FIG. 6, scheduler 414 may determine that terminal device 402 is not within the predefined distance of any of terminal devices 404-410, and may therefore assign terminal device 402 to its own grouping 602. Scheduler 414 may determine that terminal devices 404 and 406 are within the predefined distance of each other and may assign terminal devices 404-406 to grouping 604. Scheduler 414 may also determine that terminal devices 408 and 410 are within the predefined distance of each other and may assign terminal devices 408 and 410 to grouping 606. In other examples, scheduler 414 may assign any number of terminal devices to a given grouping, such as by determining that each of a group of terminal devices are within the predefined distance of each of the other terminal devices (e.g., a group of three terminal devices for which each terminal device is within the predefined distance of each of the other two terminal devices) and/or determining that each of the group of terminal devices is within the predefined distance of at least a certain proportion of the other terminal devices (e.g., a group of three terminal devices for which each terminal device is within the predefined distance of at least one of the other two terminal devices).

As previously indicated, in some aspects scheduler 414 may additionally or alternatively use radio measurements to identify the groupings in stage 504. For example, the reporting information may include radio measurements such as signal strength measurements by terminal devices 402-410. The signal strength measurements may therefore characterize the received signal strength of a signal received at one of terminal devices 402-410 from another of terminal devices 402-410, such as a signal strength measurement by terminal device 402 on a signal transmitted by terminal device 410. As signal strength measurements may generally scale inversely with distance (e.g., when disregarding other attenuation factors), higher signal strength measurements may indicate that the terminal devices are proximate while lower signal strength measurements may indicate that the terminal devices are distant. Accordingly, scheduler 414 may therefore in stage 504 compare the signal strength measurements between terminal devices 402-410 to a predefined signal strength threshold. If the signal strength measurement between a given pair of terminal devices 402-410 is greater than the predefined signal strength threshold, scheduler 414 may assign the pair of terminal devices to a grouping. With reference to the example of FIG. 6, scheduler 414 may determine that the received signal strength between terminal device 402 and each of terminal devices 404-410 is less than the predefined signal strength threshold, and may therefore assign terminal device 402 to its own grouping 602. Scheduler 414 may determine that the received signal strength between terminal devices 404 and 406 is greater than the predefined signal strength threshold and may therefore assign terminal devices 404 and 406 to grouping 604. Scheduler 414 may determine that the received signal strength between terminal devices 408 and 410 is greater than the predefined signal strength threshold and then assign terminal devices 408 and 410 to grouping 606.

Scheduler 414 may also assign groupings of any number of terminal devices based on the signal strength measurements. For example, scheduler 414 may identify a group of terminal devices for which the received signal strength between each terminal device in the group is greater than the predefined signal strength threshold and assign the group of terminal devices to a grouping (e.g., a group of three terminal devices for which each terminal device has a received signal strength with each of the other two terminal devices that is above the predefined signal strength threshold). In another example, scheduler 414 may identify a group of terminal devices for which each terminal device has a received signal strength above the predefined signal strength threshold with at least a certain proportion of the other terminal devices (e.g., a group of three terminal devices for which each terminal device has a received signal strength with at least one of the other two terminal devices that is above the predefined signal strength threshold).

According to these examples, scheduler 414 may therefore be configured to identify groupings of terminal devices based on the reporting information in stage 504. After identifying the groupings, scheduler 414 may be configured to determine the distance between the groupings in stage 506. In some aspects, scheduler 414 may be configured to determine the distance between the groupings based on the reporting information. For example, scheduler 414 may use the position reports in the reporting information to identify the positions of terminal devices in each grouping and subsequently use these positions to determine the distances between groupings. Referring to the example of FIG. 6, scheduler 414 may use the positions of the terminal devices in grouping 602 (e.g., of terminal device 402) and the positions of terminal devices in grouping 604 (e.g., of terminal devices 404 and 406) to determine the distance between groupings 602 and 604. In various aspects, scheduler 414 may determine the distance between groupings in stage 506 as the distance between the closest terminal devices in each grouping, the distance between the furthest terminal devices in each grouping, the average distance between terminal devices in each grouping, the distance between a center position of each grouping, or any other distance metric that quantifies the distance between groupings.

As previously indicated, the signal strength measurements between terminal devices may scale inversely with distance. In another example, scheduler 414 may therefore additionally or alternatively use signal strength measurements to determine the distances between groupings in stage 506. Scheduler 414 may use signal strength measurements between terminal devices in groupings as representative of the distance between groupings and/or may estimate the distance between groupings based on the signal strength measurements between terminal devices in the groupings (e.g., by using a free-space pathloss model to approximate distance based on received signal strength). Referring to the example of FIG. 6, scheduler 414 may determine the distance between groupings 602 and 604 based on the received signal strength between terminal device 402 and terminal devices 404 and 406 (e.g., based on an average of the received signal strength between terminal devices 402 and 404 and the received signal strength between terminal devices 402 and 404). As shown by the positioning of groupings 602-606 in FIG. 6, groupings 604 and 606 may be closer to each other than grouping 602. This may be reflected in the distances determined by scheduler 414 in stage 506, which may indicate that the distance between grouping 604 and 606 is less than the distance between groupings 602 and 604 and the distance between groupings 602 and 606.

At the conclusion of stage 506, scheduler 414 may have distances between the groupings, where the distances may be expressed as geographic distances (e.g., the distance between two geographic points, including estimated distances based on received signal strength) or signal strength measurements. Scheduler 414 may then in stage 508 select radio resources for the groupings based on the distances. As previously indicated, scheduler 414 may be configured to select radio resources for terminal devices based on their geographic distances from each other, which can assist in mitigating near-far problems as shown for FIG. 3. In one example, scheduler 414 may be configured to select radio resources for terminal devices where the separation in radio resources (e.g., in time and/or frequency) depends on the distances between the terminal devices, such as where scheduler 414 allocates proximate radio resources (e.g., directly adjacent or proximate) to terminal devices that are proximate to each other and allocates distant radio resources (e.g., separated by a distance in frequency and/or time) to terminal devices that are distant to each other. In some aspects where scheduler 414 uses signal strength measurements as representative of distance, scheduler 414 may allocate proximate radio resources to terminal devices with high received signal strength between them and may allocate distant radio resources to terminal devices with low received signal strength.

Figure 7:
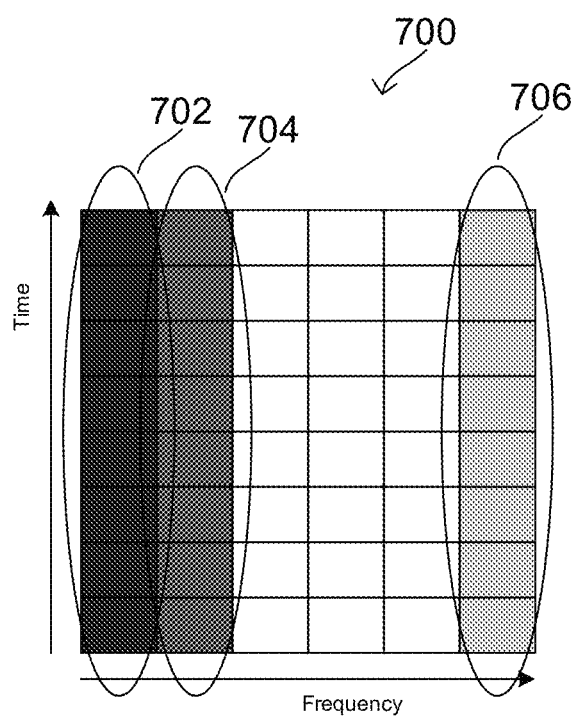
FIG. 7 shows an exemplary resource grid with radio resource allocations separated in frequency according to some aspects.
Figure 8:
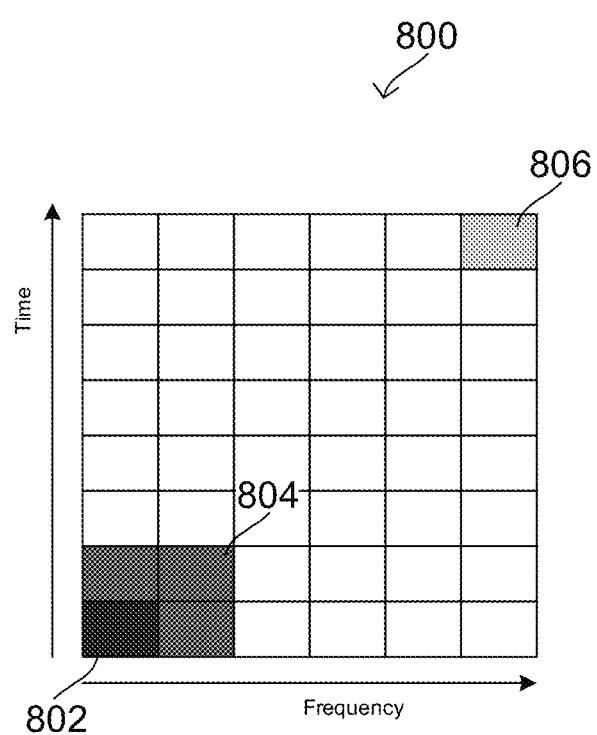
FIG. 8 shows an exemplary resource grid with radio resource allocations separated in frequency according to some aspects.

FIG. 7 shows an exemplary resource grid 700 according to some aspects that illustrates an exemplary resource allocation to terminal devices 402-410. The resource allocation of FIG. 7 shows a resource allocation that separates allocated radio resources in time, while FIG. 8 shows a resource allocation that separates allocated radio resources in time and frequency. As previously described for the example of FIG. 6, scheduler 414 may determine the distances between groupings 602-606 in stage 506, which may indicate that groupings 604 and 606 are closer than grouping 602 relative to both grouping 604 and 606 (e.g., that the geographic distance is less or that the received signal strength is greater). As scheduler 414 is configured to allocate proximate radio resources to proximate terminal devices and distant radio resources to distant terminal devices, scheduler 414 may be configured to allocate radio resources to groupings 604 and 606 that are proximate and to allocate radio resources to grouping 602 that are distant from those allocated to groupings 604 and 606. Accordingly, in the example of FIG. 7, scheduler 414 may be configured to allocate radio resources 702 to grouping 606, allocate radio resources 704 to grouping 604, and allocate radio resources 702 to grouping 602. Radio resources 702, 704, and 706 may be separated from each other in frequency (e.g., on different subcarriers, spectrum, or channels). As shown for the example of resource grid 700 in FIG. 7, scheduler 414 may allocate radio resources 702 and 704 (for groupings 606 and 604, respectively) as being proximate to each other and may allocate radio resources 706 as being distant to radio resources 702 and 704.

FIG. 7 shows only one example of a resource allocation by scheduler 414 based on the distances between terminal devices. Various aspects may therefore use differing techniques to determine this resource allocation based on the distances between terminal devices (e.g., where the separation in allocated radio resources between terminal devices depends on the distances between the terminal devices). For example, in some aspects, scheduler 414 may be configured to allocate adjacent radio resources for the closest groupings (e.g., radio resources that are on adjacent subcarriers, spectrum, or channels in frequency), or may be configured to allocate proximate radio resources for the closest groupings (e.g., radio resources that are not directly adjacent but still proximate, such as subcarriers or channels that are separated by several subcarriers or channels).

In some aspects, scheduler 414 may be configured to allocate radio resources that are separated by a maximum possible separation to the groupings that are furthest apart. For example, there may be a predefined pool of radio resources available for allocation (e.g., as defined by the system bandwidth, such as a number of resource blocks or subcarriers available for allocation). For the groupings that are furthest from each other, scheduler 414 may therefore allocate radio resources to one grouping that are at one end of the predefined pool (e.g., the lowest frequencies) and allocate radio resources to the other grouping that are on the opposite end of the predefined pool (e.g., the highest frequencies).

While FIG. 7 shows an exemplary allocation where scheduler 414 separates resource allocations to groupings in frequency, FIG. 8 shows an exemplary allocation for resource grid 800 according to some aspects where scheduler 414 separates resource allocations to groupings in time and frequency. For example, with continued reference to the example of FIG. 6, scheduler 414 may allocate radio resources 802 to grouping 606, allocate radio resources 804 to grouping 604, and allocate radio resources 806 to grouping 602. As shown in FIG. 8, radio resources 802 may be in the lower-left corner of resource grid 800 (e.g., lower frequencies and earlier time slots within the subframe) while radio resources 804 may be adjacent to radio resources 802 (e.g., adjacent over time and/or frequency). Radio resources 806 may be in the upper-right corner of resource grid 800 (e.g., higher frequencies and later time slots within the subframe). Scheduler 414 may therefore separate the radio resources allocated to groupings 602-606 depending on the distances between groupings 602-602, namely by allocating radio resources to groupings 604 and 606 that are closer together in time and frequency than the radio resources allocated to grouping 602. Scheduler 414 may therefore allocate radio resource to terminal devices where the separation between radio resources allocated to groupings that are close together is less than the separation between radio resources allocated to groupings that are further apart. The allocation of resource grid 800 is exemplary, and various aspects may separate the radio resources allocated to groupings 602-606 in different ways (e.g., by positioning the allocated radio resources at different locations in resource grid 800).

With continued reference to FIG. 5, scheduler 414 may therefore use any of a variety of techniques to select the radio resources for groupings based on the distances between the groupings in stage 508, where the selected radio resources for the groupings may be separated from each other depending on the distance between the groupings. After selecting the radio resources in stage 508, scheduler 414 may in stage 510 send control signaling to terminal devices 402-410 that specifies the radio resources allocated to each of terminal devices 402-410. Scheduler 414 may send the control signaling via network access node 412, where scheduler 414 may send the control signaling to network access node 412 for wireless transmission to terminal devices 402-410.

Terminal devices 402-410 may receive the control signaling from scheduler 414 and subsequently transmit and/or receive with the allocated radio resources in stage 512. For example, the control signaling may specify the radio resources (e.g., the time-frequency resources on a resource grid, such as certain subcarriers and/or certain time slots) allocated to each terminal device. A counterpart scheduler (e.g., in the baseband modems of terminal devices 402-410) may read the control signaling and subsequently control radio activity based on the control signaling, such as by transmitting and/or receiving on the radio resources allocated to each respective terminal device.

As previously introduced, in some cases this resource allocation routine by scheduler 414 may mitigate impacts of the near-far problem. For example, scheduler 414 may allocate radio resources 704 to terminal devices 404 and 406 (e.g., to grouping 604) for transmission and may allocate radio resources 706 to terminal device 402 (e.g., to grouping 602) for transmission, where radio resources 702 and 706 may be separated as shown in resource grid 700 in FIG. 7. In an exemplary scenario, terminal device 402 may attempt to transmit an information signal to terminal device 410, and may therefore use radio resources 706 for the transmission. Terminal device 404 may perform a simultaneous transmission, which may therefore be an interference signal. Terminal device 410 may attempt to receive the information signal by receiving and decoding radio resources 706.

As radio resources 702 and 706 are separated in frequency, terminal device 410 may still be able to successfully receive and decode the interference signal even in the face of the interference signal transmitted by terminal device 404. Even though terminal device 410 may see the interference signal with a higher received signal strength than the interference signal (due to the smaller distance between terminal devices 404 and 410 compared to the distance between terminal devices 402 and 410), the separation between radio resources 702 and 706 may avoid leakage from the interference signal onto the information signal. Accordingly, the resource allocation (to allocate radio resources to terminal devices that are separated depending on the distance between the terminal devices) by scheduler 414 may help to avoid the near-far problem.

Scheduler 414 can similarly mitigate the near-far problem when separating radio resources in time and frequency depending on the distance between terminal devices, such as shown in resource grid 800 in FIG. 8. For example, in a similar scenario to that described immediately above, scheduler 414 may allocate radio resources 802 to grouping 606, allocate radio resources 804 to grouping 604, and allocate radio resources 806 to grouping 602. Accordingly, when terminal device 602 attempts to transmit an information signal to terminal device 606 simultaneous to transmission of an interference signal by terminal device 404, the separation of radio resources 802 and 806 in time and frequency may avoid leakage of the interference signal onto the information signal. Terminal device 410 may therefore still be able to receive and decode the information signal.

Figure 9:
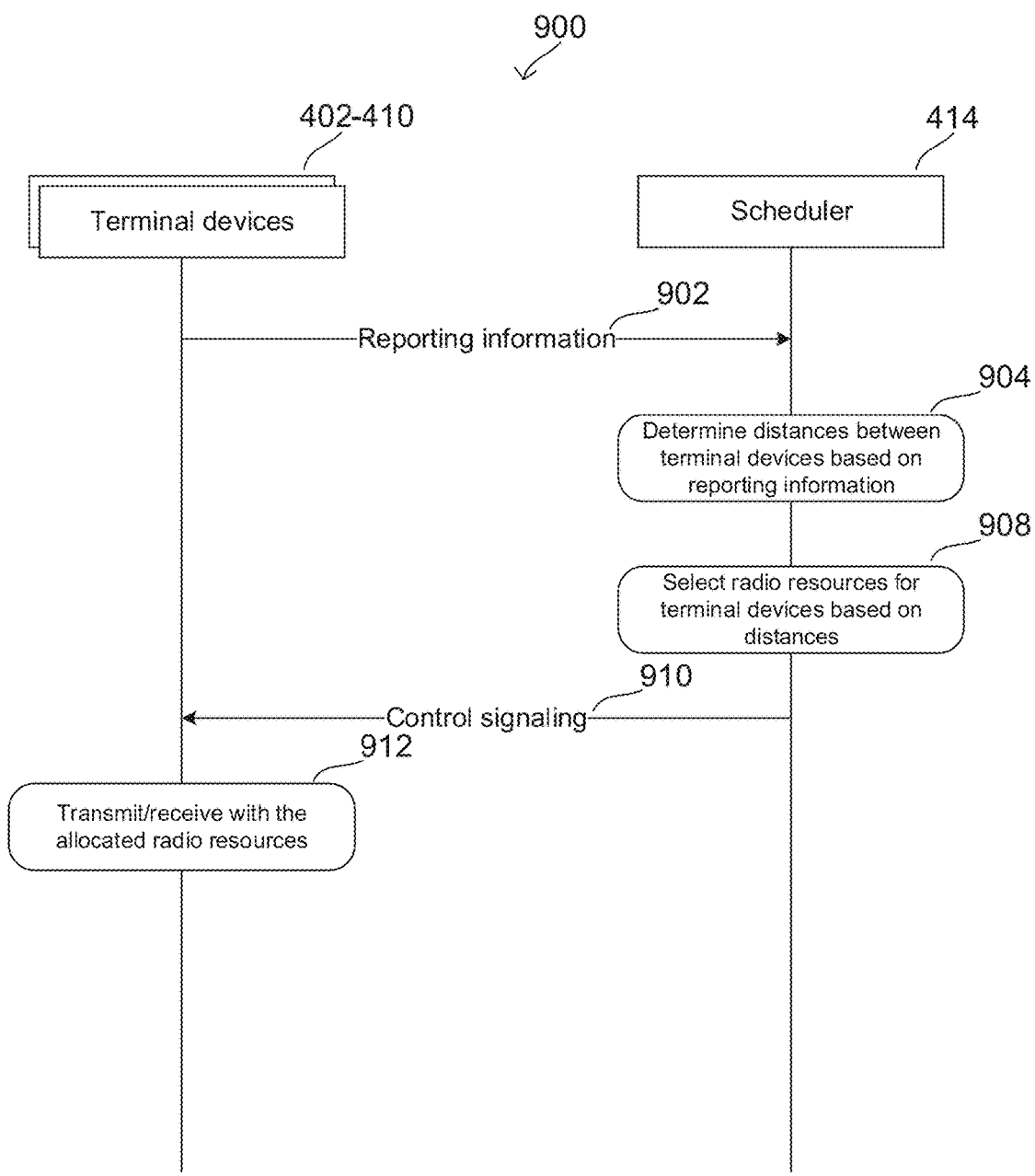
FIG. 9 shows an exemplary message sequence chart describing a resource allocation routine according to some aspects.

Various aspects described above provide a resource allocation routine with which scheduler 414 may use groupings to allocate radio resources to terminal devices that are separated (e.g., in time and/or frequency) based on the geographic distance between the terminal devices. For example, as described for FIG. 5, scheduler 414 may identify groupings of terminal devices that are proximate, determine distances between the groupings, and use these distances between groupings to select radio resources for the groupings. In other aspects, scheduler 414 may select the radio resources to allocate to terminal devices based directly on the distances between them (e.g., without assigning the terminal devices to groups). FIG. 9 shows exemplary message sequence chart 900 illustrating this procedure according to some aspects. As shown in FIG. 9, terminal devices 402-410 may provide reporting information (e.g., position reports and/or radio measurements) to scheduler 414 in stage 902. Scheduler 414 may then determine the distances (e.g., by determining the distance between positions, estimating the distance based on a signal strength measurement, and/or by using a signal strength measurement to represent distance) between terminal devices 402-410 based on the reporting information in stage 904. For example, with reference to FIG. 4, scheduler 414 may determine the distances between each of terminal devices 402-410.

Scheduler 414 may then select radio resources for terminal devices 402-410 in stage 908 based on the distances, where the separation in radio resources for terminal devices 402-410 are separated in time and/or frequency depending on the distances between terminal devices 402-410. For example, as described for previous examples, scheduler 414 may allocate radio resources to proximate terminal devices that are closer (e.g., closer in time and/or frequency) than the radio resources allocated to distant terminal devices. In other words, the separation between radio resources allocated to proximate terminal devices may be less than the separation between radio resources allocated to distant terminal devices. In the example of FIG. 4, the radio resources that scheduler 414 allocates to terminal devices 404 and 406 may be separated by less than the radio resources allocated to terminal devices 402 and 404 (e.g., the radio resources allocated to terminal device 402 may be further from the radio resources allocated to terminal device 404 than the radio resources allocated to terminal device 406). As previously described for resource grids 700 and 800, scheduler 414 may use any of a number of techniques to select the specific radio resources to allocate to terminal devices 402-410, such as by allocating adjacent radio resources to the closest terminal devices and/or allocating the furthest possible radio resources to the furthest terminal devices. In some aspects, scheduler 414 may use a brute force approach and may evaluate different resource allocations to identify a resource allocation that provides maximum separation between radio resources allocated to the furthest terminal devices.

After selecting the radio resources to allocate to terminal devices 402-410 in stage 908, scheduler 414 may send control signaling to terminal devices 402-410 that specifies the radio resources allocate to terminal devices 402-410. Terminal devices 402-410 may then transmit and/or receive with their respectively allocated radio resources in stage 912.

In various aspects described above, scheduler 414 may be a network-side component, such as a component of a network access node or as a core network server. While applicable for many use cases, this network-side deployment of scheduler 414 may be used for vehicular communication scenarios such as Cellular Vehicle-to-Anything (C-V2X). For example, C-V2X provides several different modes including Mode 3, which specifies that the network is responsible for allocating radio resources to vehicles. Accordingly, in some aspects terminal devices 402-410 may be vehicles served by scheduler 414, where scheduler 414 may allocate radio resources to terminal devices 402-410 using Mode 3. As described in various aspects above, scheduler 414 may provide control signaling to terminal devices 402-410 that specify radio resources allocated to terminal devices 402-410. Terminal devices 402-410 may then utilize the allocated radio resources for C-V2X communications.

Figure 10:
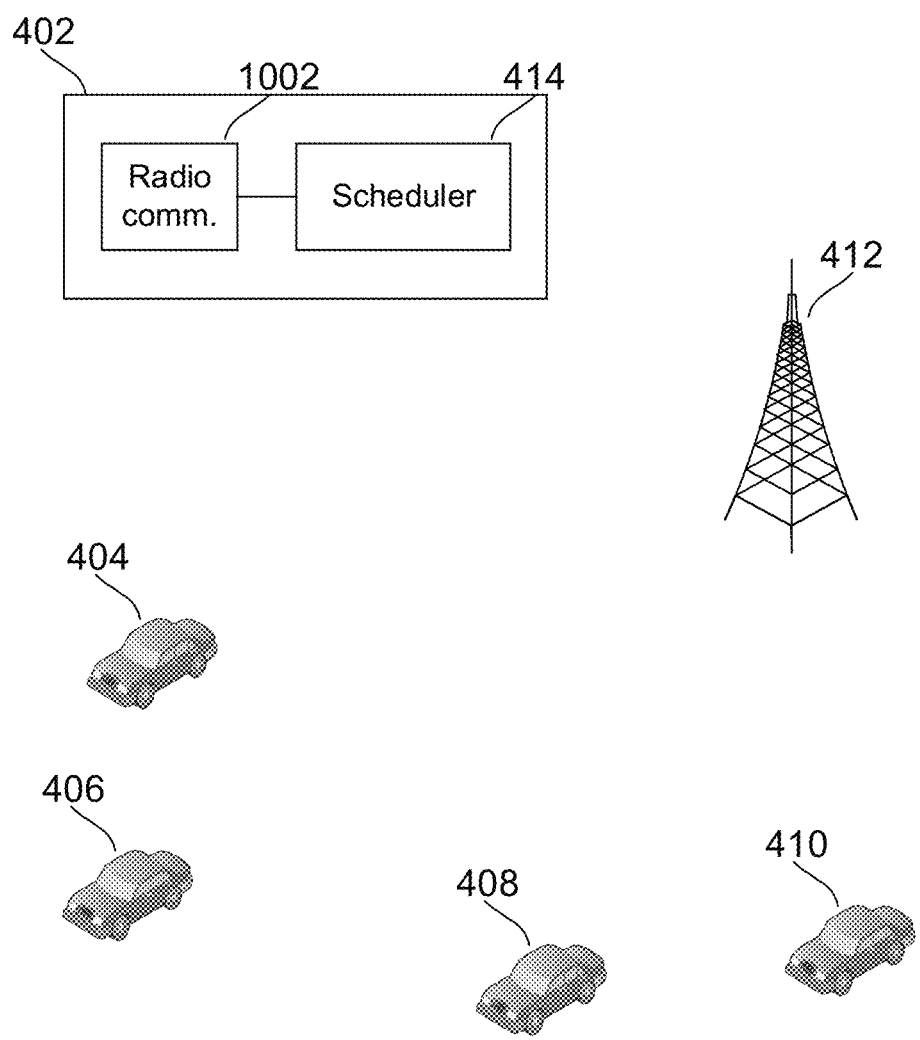
FIG. 10 shows an exemplary network illustration including a scheduler deployed with a user-side deployment according to some aspects.

In some aspects, scheduler 414 may be a user-side component. For example, instead of having a network-side deployment in a network access node or core network server, scheduler 414 may be deployed as part of a terminal device. FIG. 10 shows an exemplary network configuration in which scheduler 414 is deployed as an internal component of terminal device 402. Scheduler 414 may function in a same or similar manner as previously described for network-side deployments. For example, with reference to FIG. 5, scheduler 414 may follow the procedure of message sequence chart 500 to obtain reporting information from terminal devices 402-410 in stage 502, identify groupings based on the reporting information in stage 504, determine distances between the groupings in stage 506, select radio resources for the groupings based on the distances in stage 508, and send control signaling to terminal devices 402-410 in stage 510. Similarly, with reference to FIG. 9, scheduler 414 may follow the procedure of message sequence chart 500 to obtain reporting information from terminal devices 402-410 in stage 902, determine distances between terminal devices 402-410 based on the reporting information in stage 904, select radio resources for terminal devices based on the distances in stage 908, and send control signaling to terminal devices 402-410 in stage 910.

As scheduler 414 may be deployed in terminal device 402 in these user-side deployments, scheduler 414 may transmit and receive signaling with terminal devices via terminal device 402. For example, as shown in FIG. 10, terminal device 402 may include radio communication system 1002 in addition to scheduler 414. Radio communication system 1002 may include components of terminal device 402 configured to perform radio communications, such as antennas, RF transceivers, and baseband modems. Scheduler 414 may transmit and receive signaling, such as reporting information and control signaling specifying resource allocations, using radio communication system 1002. For example, when terminal devices 402-410 send reporting information to scheduler 414, they may send the reporting information to terminal device 402. Scheduler 414 may then receive the reporting information via radio communication system 1002. In the case of terminal device 402, radio communication system 1002 may provide the reporting information for terminal device 402 to scheduler 414, which may then use this reporting information in the same manner as the reporting information for terminal devices 404-410.

Scheduler 414 may likewise transmit signaling, such as the control signaling of stages 510 and 910, via radio communication system 1002. For example, scheduler 414 may transmit the control signaling for terminal devices 404-410 via radio communication system 1002 to terminal device 404-410. Terminal devices 404-410 may receive their respective control signaling and identify their respectively allocated radio resources. As scheduler 414 may be deployed within terminal device 402, scheduler 414 may provide the control signaling for terminal device 402 to radio communication system 1002, which may determine the radio resources allocated to terminal device 402 from the control signaling.

In some aspects, this user-side deployment of scheduler 414 may be used with vehicular communication use cases such as C-V2X. For example, C-V2X provides a Mode 4 in which vehicles use autonomous resource allocation, e.g., where the vehicles are responsible for allocating radio resources (compared to the network resource allocation of Mode 3). Accordingly, in an exemplary scenario where terminal devices 402-410 are vehicles, terminal devices 402-410 may provide their reporting information (e.g., position reports and/or radio measurements) to scheduler 414 (e.g., by transmitting the reporting information to terminal device 402). Scheduler 414 may then select radio resources to allocate to terminal devices 402-410 based on the distances between terminal devices 402-410, after which scheduler 414 may send control signaling to terminal devices 402-410 that identifies the radio resources respectively allocated to terminal devices 402-410. Terminal devices 402-410 may then use the radio resources to transmit and receive with C-V2X.

Figure 11:
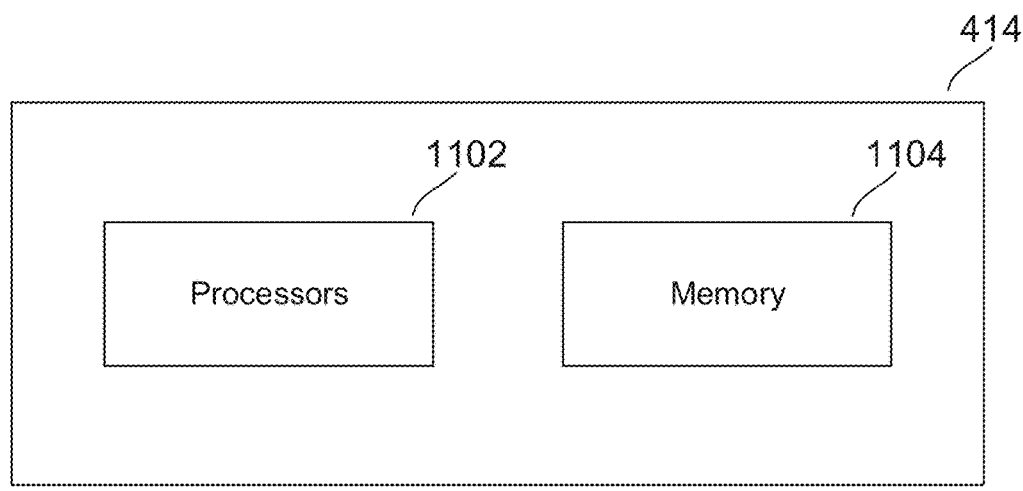
FIG. 11 shows an exemplary configuration of a scheduler according to some aspects.

FIG. 11 shows an exemplary configuration of scheduler 414 according to some aspects, where scheduler 414 includes one or more processors 1102 and memory 1104. As previously indicated, in some aspects one or more processors 1102 may be configured to retrieve, from memory 1104, program code that defines the resource allocation routine as executable instructions. The resource allocation routine may operate according to any principles described herein.

Figure 12:
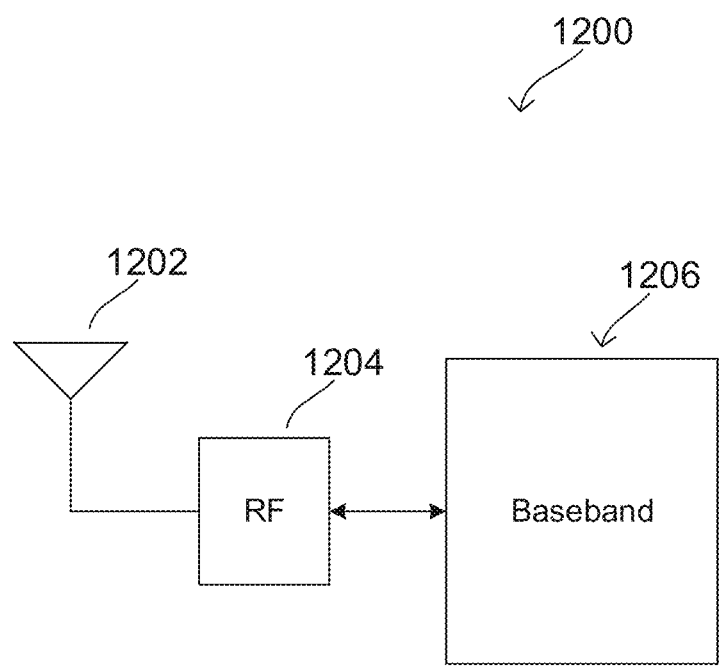
FIG. 12 shows an exemplary configuration of a terminal device according to some aspects.

FIG. 12 shows an exemplary configuration of terminal device 1200 according to some aspects. In various aspects, any vehicle or terminal device shown or described for FIGS. 1-11 may be configured in the manner of or include terminal device 1200. For example, a vehicle may include terminal device 1200 as part of its communication circuitry, while a standalone terminal device (e.g., a mobile phone, laptop, IoT device, and the like) may be configured in the manner of terminal device 1200 (optionally with additional components).

As shown in FIG. 12, terminal device 1200 may include antenna system 1202, RF transceiver 1204, and baseband modem 1206. Terminal device 1200 may be configured to transmit and receive radio signals via antenna system 1202, which may include one or more antennas. RF transceiver 1204 may perform transmit and receive radio processing, such as up RF upmixing/downmixing, ADC/DAC, amplification, and/or any other RF processing. In the receive direction, RF transceiver 1204 may provide received baseband data to baseband modem 1206, which may perform baseband processing on the received baseband data. In the transmit direction, baseband modem may provide outgoing baseband data to RF transceiver 1204, which may then transmit the baseband data via antenna system 1202.

In some aspects, baseband modem 1206 may include one or more processors configured to execute program code that defines the control operations of terminal device 1200. For example, with reference to the procedures of flow chart 500 in FIG. 5 and flow chart 900 in FIG. 9, baseband modem 1206 may be configured to execute the described functionality of the various terminal devices. As previously described, this can include collecting and sending reporting information to scheduler 414 (e.g., located in the NW or in another terminal device), receiving and reading control signaling to identify respectively allocated radio resources, and transmitting/receiving with the allocated radio resources specified in the control signaling. A baseband modem 1206 included in the various terminal devices and/or vehicles may therefore handle such functionality.

Figure 13:
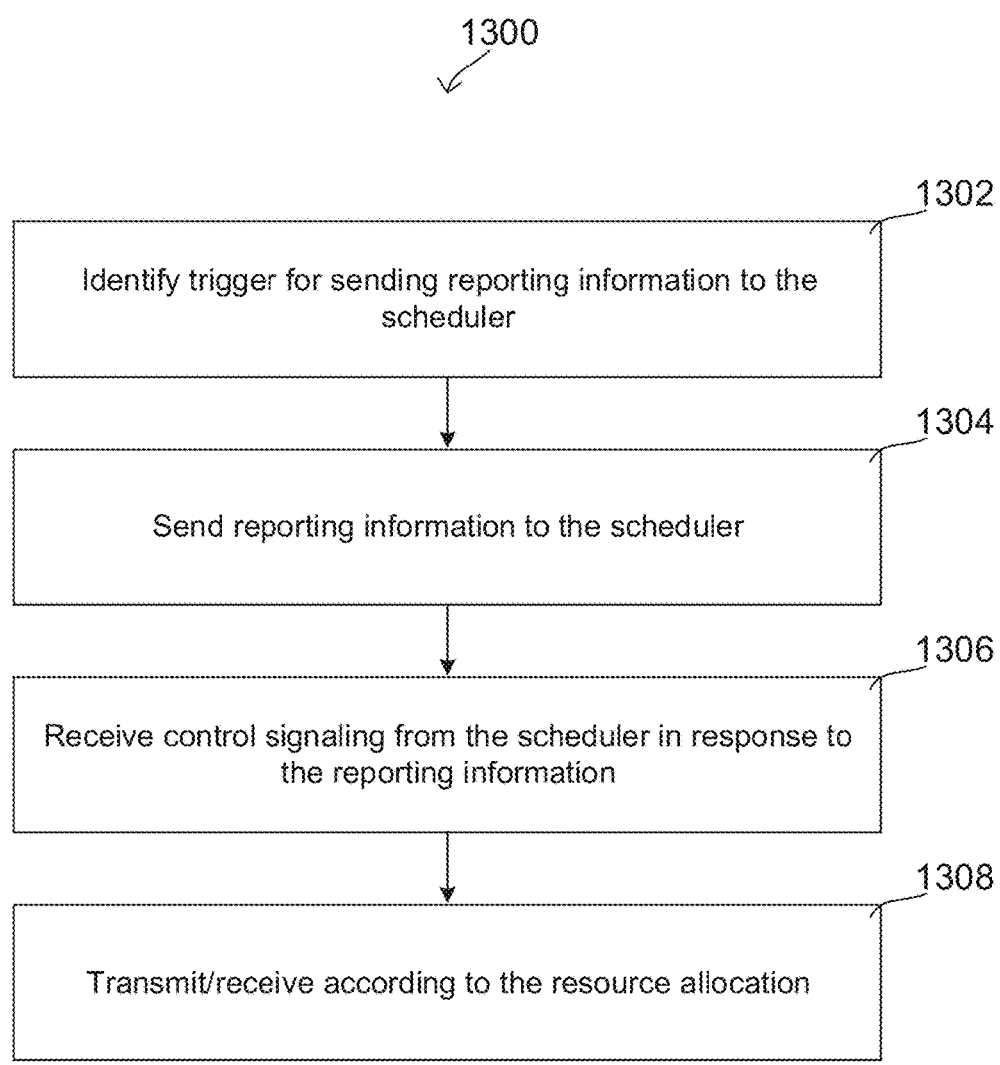
FIG. 13 shows an exemplary flow chart describing operation of a terminal device according to some aspects.

FIG. 13 shows exemplary flow chart 1300 describing operation of terminal device 1200 according to some aspects. In some aspects, baseband modem 1206 of terminal device 1200 may be configured to perform the procedure of flow chart 1300, such as by executing program code that controls baseband modem 1206 to perform the functionality.

As shown in FIG. 13, terminal device 1200 may identify a trigger for sending reporting information to scheduler 414 in stage 1302. In some aspects, scheduler 414 may be configured to transmit a reporting information request to various terminal devices, and terminal device 1200 may be configured to identify the trigger based on receiving a reporting information request from scheduler 414. In some aspects, terminal device 1200 may identify the trigger autonomously, such as based on a periodic reporting timer (e.g., where the expiry prompts terminal device 1200 to send the reporting information) or based on detection of an environmental condition (e.g., a radio measurement meeting a certain criteria).

After identifying the trigger in stage 1302, terminal device 1200 may send the reporting information to scheduler 414 in stage 1304. In various aspects, the reporting information can include any type of reporting information described above. In some aspects, baseband modem 1206 may perform a radio measurement (e.g., a signal strength measurement) to include in the reporting information. In some aspects, baseband modem 1206 may use a geopositional sensor to determine a position of terminal device 1200, and may include the position in the reporting information.

Scheduler 414 may then determine resource allocations, e.g., for multiple terminal devices including terminal device 1200, as previously described above. Then, terminal device 1200 may receive a control signaling from scheduler 414 in response to the reporting information in stage 1306. Terminal device 1200 may read the control signaling and determine the resource allocation for terminal device 1200. Terminal device 1200 may then transmit and/or receive according to the resource allocation in stage 1308.

Figure 14:
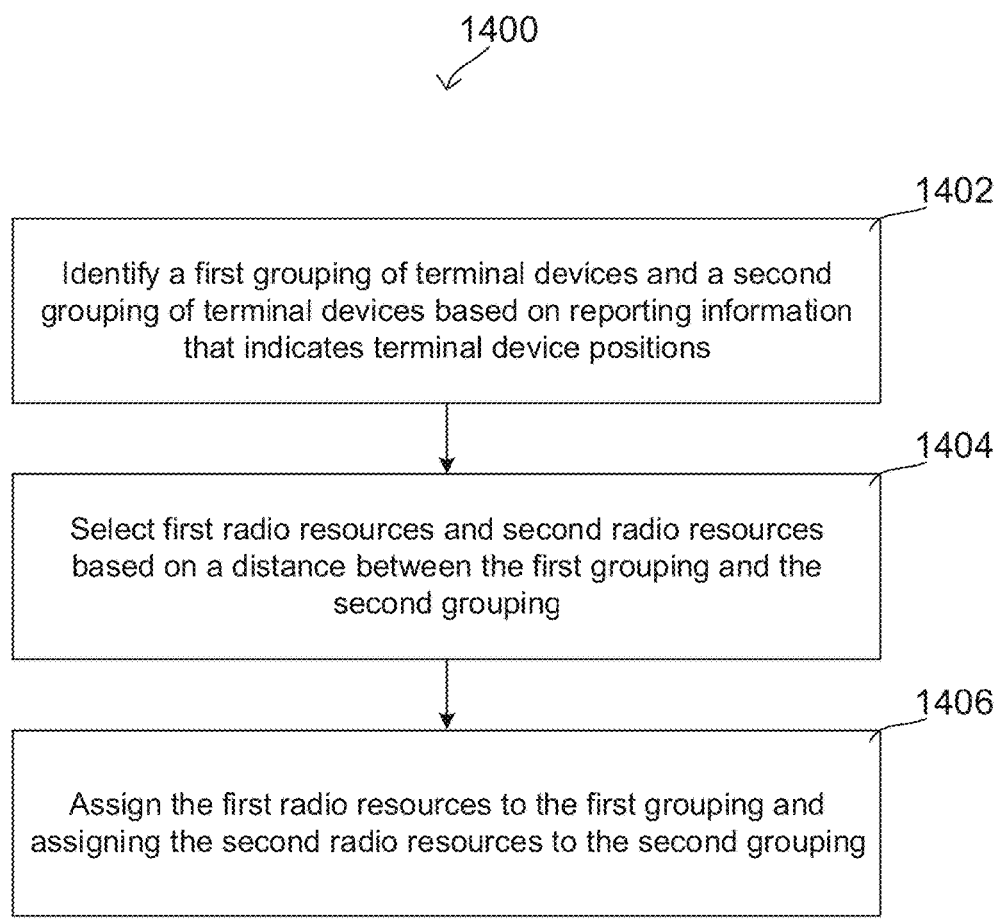
FIG. 14 shows a first exemplary method of allocating radio resources according to some aspects.

FIG. 14 shows exemplary method 1400 of allocating radio resources according to some aspects. As shown in FIG. 14, method 1400 includes identifying a first grouping of terminal devices and a second grouping of terminal devices based on reporting information that indicates terminal device positions (1402), selecting first radio resources and second radio resources based on a distance between the first grouping and the second grouping (1404), and assigning the first radio resources to the first grouping and assigning the second radio resources to the second grouping (1406).

Figure 15:
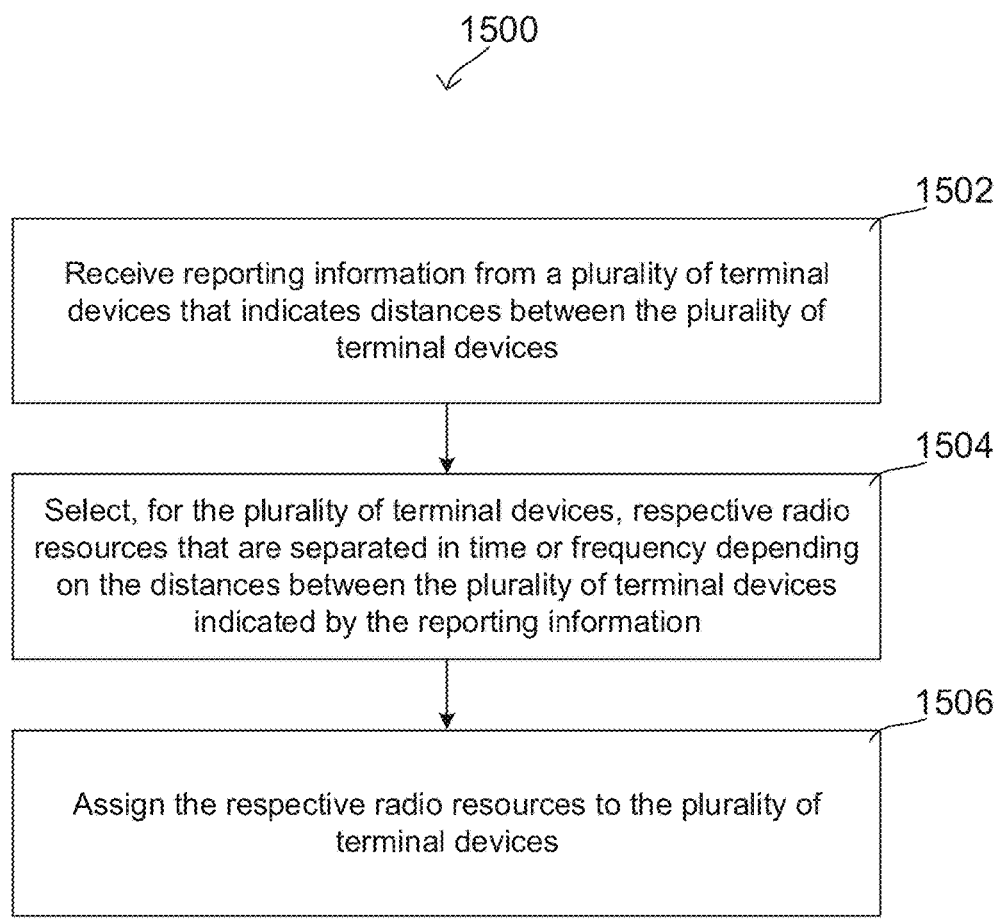
FIG. 15 shows a second exemplary method of allocating radio resources according to some aspects.

FIG. 15 shows exemplary method 1500 of allocating radio resources according to some aspects. As shown in FIG. 15, method 1500 includes receiving reporting information from a plurality of terminal devices that indicates distances between the plurality of terminal devices (1502), selecting, for the plurality of terminal devices, respective radio resources that are separated in time or frequency depending on the distances between the plurality of terminal devices indicated by the reporting information (1504), and assigning the respective radio resources to the plurality of terminal devices (1506).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a method of allocating radio resources, the method including identifying a first grouping of terminal devices and a second grouping of terminal devices based on reporting information that indicates terminal device positions, selecting first radio resources and second radio resources based on a distance between the first grouping and the second grouping, and assigning the first radio resources to the first grouping and assigning the second radio resources to the second grouping.

In Example 2, the subject matter of Example 1 can optionally include wherein identifying the first grouping of terminal devices and the second grouping of terminal devices includes determining a distance between a first terminal device and a second terminal device based on the reporting information, and determining that the distance is less than a predefined distance, and identifying the first and second terminal device as the first grouping.

In Example 3, the subject matter of Example 2 can optionally include wherein the reporting information includes position reports from the first terminal device and the second terminal device that indicate their positions, and wherein determining the distance between the first terminal device and the second terminal device includes comparing their positions to determine the distance.

In Example 4, the subject matter of Example 2 can optionally include wherein the reporting information includes a received signal strength between the first terminal device and the second terminal device, and wherein determining the distance between the first terminal device and the second terminal device includes estimating the distance based on the received signal strength.

In Example 5, the subject matter of Example 1 can optionally include wherein the reporting information includes a received signal strength between the first terminal device and the second terminal device, and wherein identifying the first grouping of terminal devices and the second grouping of terminal devices based on the reporting information includes determining that the received signal strength between the first terminal device and the second terminal device is greater than a predefined signal strength threshold, and identifying the first and second terminal device as the first grouping.

In Example 6, the subject matter of any one of Examples 1 to 5 can optionally include wherein the reporting information includes position reports or received signal strength measurements from the first grouping of terminal devices and the second grouping of terminal devices.

In Example 7, the subject matter of any one of Examples 1 to 6 can optionally include wherein selecting the first and second radio resources based on the distance between the first and the second grouping includes selecting radio resources that are separated in time or frequency depending on the distance between the first grouping and the second grouping.

In Example 8, the subject matter of any one of Examples 1 to 7 can optionally include wherein assigning the first radio resources to the first grouping and assigning the second radio resources to the second grouping includes transmitting control signaling to the first grouping that specifies the first radio resources and transmitting control signaling to the second grouping that specifies the second radio resources.

In Example 9, the subject matter of Example 8 can optionally include wherein transmitting the control signaling to the first grouping includes transmitting the control signaling via a network access node.

In Example 10, the subject matter of Example 8 can optionally include wherein transmitting the control signaling to the first grouping includes transmitting the control signaling via a radio communication system of a terminal device.

In Example 11, the subject matter of any one of Examples 1 to 10 can optionally further include identifying a third grouping of terminal devices that is closer to the second grouping of the terminal devices than the first grouping of terminal devices, selecting third radio resources based on distances between the first grouping, the second grouping, and the third grouping, and assigning the third radio resources to the third grouping.

In Example 12, the subject matter of Example 11 can optionally include wherein selecting the third radio resources includes selecting, as the third radio resources, radio resources that are closer to the second radio resources than the first radio resources.

Example 13 is a method of allocating radio resources, the method including receiving reporting information from a plurality of terminal devices that indicates distances between the plurality of terminal devices, selecting, for the plurality of terminal devices, respective radio resources that are separated in time or frequency depending on the distances between the plurality of terminal devices indicated by the reporting information, and assigning the respective radio resources to the plurality of terminal devices.

In Example 14, the subject matter of Example 13 can optionally include wherein the reporting information includes position reports from the plurality of terminal devices or received signal strength measurements between the plurality of terminal devices.

In Example 15, the subject matter of Example 13 or 14 can optionally further include determining the distances between the plurality of terminal devices based on the reporting information.

In Example 16, the subject matter of Example 15 can optionally include wherein the reporting information includes position reports for the plurality of terminal devices, and wherein determining the distances between the plurality of terminal devices includes determining the distances between the terminal devices with the position reports.

In Example 17, the subject matter of Example 15 can optionally include wherein the reporting information includes received signal strength measurements between the plurality of terminal devices, and wherein determining the distances between the plurality of terminal devices based on the reporting information includes estimating the distances between the plurality of terminal devices based on the received signal strength measurements.

In Example 18, the subject matter of Example 13 can optionally include wherein the reporting information includes received signal strength measurements between the terminal devices that indicate the distances between the terminal devices, and wherein selecting the respective radio resources includes selecting the respective radio resources based on the distances indicated by the received signal strength measurements.

In Example 19, the subject matter of any one of Examples 13 to 18 can optionally include wherein the plurality of terminal devices include a first terminal device, a second terminal device, and a third terminal device that is closer to the second terminal device than the first terminal device, and wherein selecting, for the plurality of terminal devices, the respective radio resources includes selecting radio resources for the third terminal device that are closer to radio resources for the second terminal device than the radio resources for the first terminal device.

In Example 20, the subject matter of any one of Examples 13 to 19 can optionally include wherein assigning the respective radio resources to the plurality of terminal devices includes transmitting control signaling to the plurality of terminal devices that specifies the respective radio resources selected for the plurality of terminal devices.

In Example 21, the subject matter of Example 20 can optionally include wherein transmitting the control signaling to the plurality of terminal devices includes transmitting the control signaling via a network access node.

In Example 22, the subject matter of Example 20 can optionally include wherein transmitting the control signaling includes transmitting the control signaling via a radio communication system of a terminal device.

Example 23 is a scheduler device including one or more processors configured to identify a first grouping of terminal devices and a second grouping of terminal devices based on reporting information that indicates terminal device positions, select first radio resources and second radio resources based on a distance between the first grouping and the second grouping, and assign the first radio resources to the first grouping and assign the second radio resources to the second grouping.

In Example 24, the subject matter of Example 23 can optionally include wherein the one or more processors are configured to identify the first grouping of terminal devices and the second grouping of terminal devices by determining a distance between a first terminal device and a second terminal device based on the reporting information, determining that the distance is less than a predefined distance, and identifying the first and second terminal device as the first grouping.

In Example 25, the subject matter of Example 24 can optionally include wherein the reporting information includes position reports from the first terminal device and the second terminal device that indicate their positions, and wherein the one or more processors are configured to determine the distance between the first terminal device and the second terminal device by comparing their positions to determine the distance.

In Example 26, the subject matter of Example 24 can optionally include wherein the reporting information includes a received signal strength between the first terminal device and the second terminal device, and wherein the one or more processors are configured to determine the distance between the first terminal device and the second terminal device by estimating the distance based on the received signal strength.

In Example 27, the subject matter of Example 23 can optionally include wherein the reporting information includes a received signal strength between the first terminal device and the second terminal device, and wherein the one or more processors are configured to identify the first grouping of terminal devices and the second grouping of terminal devices based on the reporting information by determining that the received signal strength between the first terminal device and the second terminal device is greater than a predefined signal strength threshold and identifying the first and second terminal device as the first grouping.

In Example 28, the subject matter of any one of Examples 23 to 27 can optionally include wherein the reporting information includes position reports or received signal strength measurements from the first grouping of terminal devices and the second grouping of terminal devices.

In Example 29, the subject matter of any one of Examples 23 to 28 can optionally include wherein the one or more processors are configured to select the first and second radio resources based on the distance between the first and the second grouping by selecting radio resources that are separated in time or frequency depending on the distance between the first grouping and the second grouping.

In Example 30, the subject matter of any one of Examples 23 to 29 can optionally include wherein the one or more processors are configured to assign the first radio resources to the first grouping and assigning the second radio resources to the second grouping by transmitting control signaling to the first grouping that specifies the first radio resources and transmitting control signaling to the second grouping that specifies the second radio resources.

In Example 31, the subject matter of Example 30 can optionally include wherein the one or more processors are configured to transmit the control signaling to the first grouping by transmitting the control signaling via a network access node.

In Example 32, the subject matter of Example 30 can optionally include wherein the one or more processors are configured to transmit the control signaling to the first grouping by transmitting the control signaling via a radio communication system of a terminal device.

In Example 33, the subject matter of any one of Examples 23 to 32 can optionally include wherein the one or more processors are further configured to identify a third grouping of terminal devices that is closer to the second grouping of the terminal devices than the first grouping of terminal devices, select third radio resources based on distances between the first grouping, the second grouping, and the third grouping, and assign the third radio resources to the third grouping.

In Example 34, the subject matter of Example 33 can optionally include wherein the one or more processors are configured to select, as the third radio resources, radio resources that are closer to the second radio resources than the first radio resources.

Example 35 is a scheduler device including one or more processors configured to receive reporting information from a plurality of terminal devices that indicates distances between the plurality of terminal devices, select, for the plurality of terminal devices, respective radio resources that are separated in time or frequency depending on the distances between the plurality of terminal devices indicated by the reporting information, and assign the respective radio resources to the plurality of terminal devices.

In Example 36, the subject matter of Example 35 can optionally include wherein the reporting information includes position reports from the plurality of terminal devices or received signal strength measurements between the plurality of terminal devices.

In Example 37, the subject matter of Example 35 or 36 can optionally include wherein the one or more processors are further configured to determine distances between the plurality of terminal devices based on the reporting information.

In Example 38, the subject matter of Example 37 can optionally include wherein the reporting information includes position reports for the plurality of terminal devices, and wherein the one or more processors are configured to determine the distances between the plurality of terminal devices by determining the distances between the terminal devices with the position reports.

In Example 39, the subject matter of Example 37 can optionally include wherein the reporting information includes received signal strength measurements between the plurality of terminal devices, and wherein the one or more processors are configured to determine the distances between the plurality of terminal devices by estimating the distances between the plurality of terminal devices based on the received signal strength measurements.

In Example 40, the subject matter of Example 35 can optionally include wherein the reporting information includes received signal strength measurements between the terminal devices that indicate the distances between the terminal devices, and wherein the one or more processors are configured to select the respective radio resources by selecting the respective radio resources based on the distances indicated by the received signal strength measurements.

In Example 41, the subject matter of any one of Examples 35 to 40 can optionally include wherein the plurality of terminal devices include a first terminal device, a second terminal device, and a third terminal device that is closer to the second terminal device than the first terminal device, and wherein the one or more processors are configured to select, for the plurality of terminal devices, the respective radio resources by selecting radio resources for the third terminal device that are closer to radio resources for the second terminal device than the radio resources for the first terminal device.

In Example 42, the subject matter of any one of Examples 35 to 41 can optionally include wherein the one or more processors are configured to assign the respective radio resources to the plurality of terminal devices by transmitting control signaling to the plurality of terminal devices that specifies the respective radio resources selected for the plurality of terminal devices.

In Example 43, the subject matter of Example 42 can optionally include wherein the one or more processors are configured to transmit the control signaling to the plurality of terminal devices by transmitting the control signaling via a network access node.

In Example 44, the subject matter of Example 42 can optionally include wherein the one or more processors are configured to transmit the control signaling by transmitting the control signaling via a radio communication system of a terminal device.

Example 45 is a terminal device including a radio communication system and the scheduler device of any one of Examples 23 to 44.

Example 46 is a network access node including the scheduler device of any one of Examples 23 to 44.

Example 47 is a non-transitory computer readable medium storing instructions that when executed by one or more processors cause the one or more processors to perform the method of any one of Examples 1 to 22.

Example 48 is a device including one or more processors, and a memory storing instructions that when executed by the one or more processors cause the one or more processors to perform the method of any one of Examples 1 to 22.

Example 49 is a terminal device including one or more processors configured to identify a trigger for sending reporting information to a scheduler, send the reporting information to the scheduler, where the reporting information indicates a position of the terminal device, receive, in response to the reporting information, control signaling from the scheduler that indicates a resource allocation, and transmit or receive according to the resource allocation.

In Example 50, the subject matter of Example 49 can optionally further include one or more antennas and a radio frequency (RF) transceiver, wherein the one or more processors are configured to transmit or receive according to the resource allocation via the one or more antennas and the RF transceiver.

In Example 51, the subject matter of Example 49 or 50 can optionally include wherein the one or more processors are configured to identify the trigger for sending the reporting information by receiving a reporting information request from the scheduler.

In Example 52, the subject matter of any one of Examples 49 to 51 can optionally include wherein the one or more processors are further configured to perform a signal strength measurement, and to include the signal strength measurement in the reporting information.

In Example 53, the subject matter of any one of Examples 49 to 52 can optionally include wherein the one or more processors are further configured to use a geopositional sensor to determine a position of the terminal device and to include the position in the reporting information.

Example 54 is a method of operating a terminal device, the method including identifying a trigger for sending reporting information to a scheduler, sending the reporting information to the scheduler, where the reporting information indicates a position of the terminal device, receiving, in response to the reporting information, control signaling from the scheduler that indicates a resource allocation, and transmitting or receiving according to the resource allocation.

In Example 55, the subject matter of Example 54 can optionally include wherein transmitting or receiving according to the resource allocation includes transmitting or receiving via the one or more antennas and the RF transceiver.

In Example 56, the subject matter of Example 54 or 55 can optionally include wherein identifying the trigger for sending the reporting information includes receiving a reporting information request from the scheduler.

In Example 57, the subject matter of any one of Examples 54 to 56 can optionally further include performing a signal strength measurement and including the signal strength measurement in the reporting information.

In Example 58, the subject matter of any one of Examples 54 to 57 can optionally further include using a geopositional sensor to determine a position of the terminal device and including the position in the reporting information.

Example 59 is a non-transitory computer readable medium storing instructions that, when executed by one or more processors, cause the one or more processors to perform a method of allocating radio resources including identifying a first grouping of terminal devices and a second grouping of terminal devices based on reporting information that indicates terminal device positions, selecting first radio resources and second radio resources based on a distance between the first grouping and the second grouping, and assigning the first radio resources to the first grouping and assigning the second radio resources to the second grouping.

In Example 60, the subject matter of Example 59 can optionally include wherein identifying the first grouping of terminal devices and the second grouping of terminal devices includes determining a distance between a first terminal device and a second terminal device based on the reporting information, and determining that the distance is less than a predefined distance, and identifying the first and second terminal device as the first grouping.

In Example 61, the subject matter of Example 60 can optionally include wherein the reporting information includes position reports from the first terminal device and the second terminal device that indicate their positions, and wherein determining the distance between the first terminal device and the second terminal device includes comparing their positions to determine the distance.

In Example 62, the subject matter of Example 60 can optionally include wherein the reporting information includes a received signal strength between the first terminal device and the second terminal device, and wherein determining the distance between the first terminal device and the second terminal device includes estimating the distance based on the received signal strength.

In Example 63, the subject matter of Example 59 can optionally include wherein the reporting information includes a received signal strength between the first terminal device and the second terminal device, and wherein identifying the first grouping of terminal devices and the second grouping of terminal devices based on the reporting information includes determining that the received signal strength between the first terminal device and the second terminal device is greater than a predefined signal strength threshold, and identifying the first and second terminal device as the first grouping.

In Example 64, the subject matter of any one of Examples 59 to 63 can optionally include wherein the reporting information includes position reports or received signal strength measurements from the first grouping of terminal devices and the second grouping of terminal devices.

In Example 65, the subject matter of any one of Examples 59 to 64 can optionally include wherein selecting the first and second radio resources based on the distance between the first and the second grouping includes selecting radio resources that are separated in time or frequency depending on the distance between the first grouping and the second grouping.

In Example 66, the subject matter of any one of Examples 59 to 65 can optionally include wherein assigning the first radio resources to the first grouping and assigning the second radio resources to the second grouping includes transmitting control signaling to the first grouping that specifies the first radio resources and transmitting control signaling to the second grouping that specifies the second radio resources.

In Example 67, the subject matter of Example 66 can optionally include wherein transmitting the control signaling to the first grouping includes transmitting the control signaling via a network access node.

In Example 68, the subject matter of Example 66 can optionally include wherein transmitting the control signaling to the first grouping includes transmitting the control signaling via a radio communication system of a terminal device.

In Example 69, the subject matter of any one of Examples 59 to 68 can optionally further include identifying a third grouping of terminal devices that is closer to the second grouping of the terminal devices than the first grouping of terminal devices, selecting third radio resources based on distances between the first grouping, the second grouping, and the third grouping, and assigning the third radio resources to the third grouping.

In Example 70, the subject matter of Example 69 can optionally include wherein selecting the third radio resources includes selecting, as the third radio resources, radio resources that are closer to the second radio resources than the first radio resources.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An apparatus comprising:
one or more processors configured to:
identify a first grouping of terminal devices and a second grouping of terminal devices based on reporting information that indicates terminal device positions;
select first radio resources and second radio resources based on a distance between the first grouping and the second grouping, so that a separation of the first and second radio resources in frequency, time, or both decreases as the distance between the first grouping and the second grouping decreases; and
assign the first radio resources to the first grouping and assign the second radio resources to the second grouping.

2. The apparatus of claim 1, wherein the apparatus is a terminal device belonging to the first grouping, wherein the one or more processors are further configured to transmit data on the first radio resources, to a terminal device of the second grouping.

3. The apparatus of claim 2, wherein the one or more processors are further configured to receive data on the second radio resources, from another terminal device of the second grouping.

4. The apparatus of claim 1, wherein the distance between the first grouping and the second grouping is determined based on a closest distance of terminal devices between the first and second groupings.

5. The apparatus of claim 1, wherein the separation of the selected first and second radio resources is a separation in time.

6. The apparatus of claim 1, wherein the separation of the selected first and second radio resources is a separation in time and frequency.

7. The apparatus of claim 1, wherein the one or more processors are further configured to:
receive the reporting information periodically from terminal devices including the terminal devices of the first grouping and the terminal devices of the second grouping; and
transmit first control signaling, to the terminal devices of the first grouping, that specifies the first radio resources; and
transmitting second control signaling, to the terminal devices of the second grouping, that specifies the second radio resources.

8. The apparatus of claim 1, further comprising:
a radio transceiver coupled to the one or more processors; and
one or more antennas coupled to the radio transceiver.

9. The apparatus of claim 1, wherein the apparatus is deployed as part of a network access node, wherein the terminal devices of the first grouping and the terminal devices of the second grouping are associated with the network access node, wherein the terminal devices of the first grouping and the terminal devices of the second grouping are vehicle-based terminal devices configured for autonomous driving.

10. The apparatus of claim 1, wherein the one or more processors are further configured to:
create a third grouping including a particular terminal device in response to determining that a distance between the particular terminal device is greater than a predetermined distance from the terminal devices of the first grouping and the terminal devices of the second grouping.

11. A method of allocating radio resources, the method comprising:
identifying a first grouping of terminal devices and a second grouping of terminal devices based on reporting information that indicates terminal device positions;
selecting first radio resources and second radio resources based on a distance between the first grouping and the second grouping, so that a separation of the first and second radio resources in frequency, time, or both decreases as the distance between the first grouping and the second grouping decreases; and
assigning the first radio resources to the first grouping and assigning the second radio resources to the second grouping.

12. The method of claim 11, wherein the method is performed by a terminal device of the first grouping, the method further comprising:
transmitting data on the first radio resources, to a terminal device of the second grouping.

13. The method of claim 11, further comprising:
transmitting a request for the reporting information; and
receiving the reporting information after having transmitted the request; and transmitting first control signaling, to other terminal devices of the first grouping, that specifies the first radio resources; and transmitting second control signaling, to the terminal devices of the second grouping, that specifies the second radio resources.

14. The method of claim 11, wherein the separation in time and/or frequency is a separation in time and frequency, wherein the terminal devices of the first grouping and the terminal devices of the second grouping are vehicle-based terminal devices configured for autonomous driving.

15. A network node, comprising:
one or more processors configured to:
identify a first grouping of terminal devices and a second grouping of terminal devices based on reporting information that indicates terminal device positions;
select first radio resources and second radio resources based on a distance between the first grouping and the second grouping, so that a separation of the first and second radio resources in frequency, time, or both decreases as the distance between the first grouping and the second grouping decreases; and
assign the first radio resources to the first grouping and assign the second radio resources to the second grouping.

16. The network node of claim 15, wherein the distance between the first grouping and the second grouping is determined based on a closest distance of terminal devices between the first and second groupings.

17. The network node of claim 15, wherein the separation of the selected first and second radio resources is a separation in time.

18. The network node of claim 15, wherein the separation of the selected first and second radio resources is a separation in time and frequency.

19. The network node of claim 15, wherein the one or more processors are further configured to:
receive the reporting information periodically from terminal devices including the terminal devices of the first grouping and the terminal devices of the second grouping; and
transmit first control signaling, to the terminal devices of the first grouping, that specifies the first radio resources; and
transmitting second control signaling, to the terminal devices of the second grouping, that specifies the second radio resources.

20. The network node of claim 15, wherein the one or more processors are further configured to:
create a third grouping including a particular terminal device in response to determining that a distance between the particular terminal device is greater than a predetermined distance from the terminal devices of the first grouping and the terminal devices of the second grouping.

* * * * *